US011397363B2

(12) United States Patent
Kawakami et al.

(10) Patent No.: US 11,397,363 B2
(45) Date of Patent: Jul. 26, 2022

(54) AUTOMATIC BIAS CONTROL CIRCUIT

(71) Applicant: NIPPON TELEGRAPH AND TELEPHONE CORPORATION, Tokyo (JP)

(72) Inventors: Hiroto Kawakami, Tokyo (JP); Shoichiro Kuwahara, Tokyo (JP); Yoshiaki Kisaka, Tokyo (JP); Masanori Nakamura, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/270,411

(22) PCT Filed: May 15, 2019

(86) PCT No.: PCT/JP2019/019280
§ 371 (c)(1),
(2) Date: Feb. 22, 2021

(87) PCT Pub. No.: WO2020/044669
PCT Pub. Date: Mar. 5, 2020

(65) Prior Publication Data
US 2022/0043320 A1 Feb. 10, 2022

(30) Foreign Application Priority Data
Aug. 31, 2018 (JP) .............................. JP2018-163770

(51) Int. Cl.
*G02F 1/21* (2006.01)
*H04B 10/079* (2013.01)
(Continued)

(52) U.S. Cl.
CPC ....... *G02F 1/212* (2021.01); *H04B 10/07955* (2013.01); *H04B 10/548* (2013.01); *H04B 10/612* (2013.01)

(58) Field of Classification Search
None
See application file for complete search history.

(56) References Cited

U.S. PATENT DOCUMENTS

2009/0115544 A1* 5/2009 Kershteyn ........... H04L 27/2096
332/103
2017/0331559 A1* 11/2017 Matsushita ........... G02F 1/2255

FOREIGN PATENT DOCUMENTS

| CN | 106154592 A | 11/2016 |
| JP | 5671130 B1 | 2/2015 |
| JP | 2017208607 A | 11/2017 |

OTHER PUBLICATIONS

H. Kawakami et al., "Auto bias control technique for optical 16-QAM transmitter with asymmetric bias dithering", Optics Express, 2011, vol. 19, No. 26, B308-B312.

(Continued)

*Primary Examiner* — David W Lambert
(74) *Attorney, Agent, or Firm* — Harness, Dickey & Pierce, P.L.C.

(57) ABSTRACT

A control processor performs, in a startup sequence of an IQ optical modulator using a nested MZI, a first-stage process of controlling, so that a signal quality of an optical QAM signal output from a monitor port of the IQ optical modulator approaches a target quality, a voltage applied by a Bias_I voltage generator to I-component MZ optical modulator, a voltage applied by a Bias_Q voltage generator to a Q-component MZ optical modulator, and a voltage applied by a Bias_Ph voltage generator to a Bias_Ph phase adjusting means for controlling an optical path length of a parent MZI. After a completion of the first-stage process, the control (Continued)

processor changes a voltage output from the Bias_Ph voltage generator by a predetermined amount.

20 Claims, 17 Drawing Sheets

(51) Int. Cl.
*H04B 10/548* (2013.01)
*H04B 10/61* (2013.01)

(56) References Cited

OTHER PUBLICATIONS

H. Kawakami et al., "Auto bias control and bias hold circuit for IQ-modulator in flexible optical QAM transmitter with Nyquist filtering", Optics Express, 2014, vol. 22, No. 23, pp. 28163-28168.
Pak S. Cho et al., "Bias Control for Optical OFDM Transmitters", IEEE Photonics Technology Letters, 2010, vol. 22, No. 14, pp. 1030-1032.
H. Kawakami et al., "Drive-amplitude-independent Auto Bias Control Circuit for QAM Signals and Its Demonstration with an InP-based IQ Modulator", ECOC2016; 42nd European Conference and Exhibition on Optical Communications, 2016, W.4.P1.SC4, p. 815-817.

\* cited by examiner

AUTOMATIC BIAS CONTROL CIRCUIT

CROSS-REFERENCE TO RELATED APPLICATIONS

This application is a 371 U.S. National Phase of International Application No. PCT/JP2019/019280 filed on May 15, 2019, which claims priority to Japanese Application No. 2018-163770 filed on Aug. 31, 2018. The entire disclosures of the above applications are incorporated herein by reference.

TECHNICAL FIELD

The present invention relates to an automatic bias control circuit. This application claims priority to Japanese Patent Application No. 2018-163770 filed in Japan on Aug. 31, 2018, of which the contents are incorporated herein.

BACKGROUND ART

Currently, in a high speed and capacity optical communication system, optical quadrature amplitude modulation (QAM) signals in signal formats with high spectral efficiency, are widely employed. In generating such an optical QAM signal, the light intensity and the optical phase need to be modulated depending on a given data sequence. In order to achieve such modulation, a configuration is typically employed in which a transmitter in which a CW light source that generates continuous light (CW light) and an in-phase/quadrature (IQ) optical modulator are combined is employed, and the IQ optical modulator is driven with a plurality of electrical drive signals corresponding to a data sequence.

The IQ optical modulator is also capable of generating an optical signal in a format other than the format of an optical QAM signal, and provides adjustment methods different depending on a signal format. The present application relates to an optical transmitter for generating an optical QAM signal. Thus, unless otherwise specified below, description about an adjustment method for the IQ optical modulator is on the assumption of generation of an optical QAM signal.

FIG. 12 is a diagram illustrating a typical example of an IQ optical modulator M and its peripheral circuits included in an optical QAM signal generation optical transmitter. The IQ optical modulator M is an optical modulator using nested Mach-Zehnder interferometers (MZIs). CW light entering the IQ optical modulator M is branched by an optical branch unit 200 inside the IQ optical modulator M, and the branched CW light beams enter each of the MZIs. These MZIs are Mach-Zehnder (MZ) type optical modulators, and these optical modulators are called herein an MZ optical modulator 2a for an in-phase component and an MZ optical modulator 2b for a quadrature component. Hereinafter, the MZ optical modulator 2a for an in-phase component is simply referred to as "I-component MZ optical modulator 2a, and the MZ optical modulator 2b for a quadrature component is referred to as "Q-component MZ optical modulator 2b".

A branch unit 21a of the I-component MZ optical modulator 2a receives one of the CW light beams branched by the optical branch unit 200 and branches the received CW light beam into two branches. An optical phase difference adjustment is applied to the optical signals branched into these two branches. A multiplexing unit 22a multiplexes the optical signals in these two branches adjusted in optical phase difference, and outputs the multiplexed signal to an optical multiplexing and demultiplexing unit 201. A branch unit 21b of the Q-component MZ optical modulator 2b receives the other of the CW light beams branched by the optical branch unit 200 and branches the received CW light beam into two branches. An optical phase difference adjustment is applied to the optical signals branched into these two branches. A multiplexing unit 22b multiplexes the optical signals in these two branches adjusted in optical phase difference, and outputs the multiplexed signal to the optical multiplexing and demultiplexing unit 201. Outputs from both of the I-component MZ optical modulator 2a and the Q-component MZ optical modulator 2b are multiplexed by the optical multiplexing and demultiplexing unit 201 so that a third MZI including the two MZIs is configured. The third MZI is herein called a parent MZI.

The output of the optical multiplexing and demultiplexing unit 201 is branched into two ports, that is, a signal output port 301 and a monitor port 302. Optical electric fields output from these two ports are closely related but not exactly the same. A difference therebetween will be described later. The optical QAM signal passing through the signal output port 301 is output from the IQ optical modulator M and sent to a transmission path. Modulated light output from the monitor port 302 is input into an IQ modulator-incorporated photodetector 300. The IQ modulator-incorporated photodetector 300 converts the input modulated light into electricity and outputs a monitor signal.

In the IQ optical modulator M, light is modulated with two types, that is, a data signal Data_I for an in-phase component and a data signal Data_Q for a quadrature component. A manner in which a modulation signal is applied slightly differs depending on a type of modulator, but here, for the sake of description, a lithium niobate (LnNbO3; Ln) type optical modulator is used. The Data_I is amplified by a differential amplifier 3a. Output voltages $\pm V_{data\_I}$ of the differential amplifier 3a are applied to a first I-component modulation unit 6a and a second I-component modulation unit 6b, respectively, to modulate optical path lengths of two arms of the I-component MZ optical modulator 2a in a push-pull fashion. Similarly, the Data_Q is amplified by a differential amplifier 3b, and output voltages $\pm V_{data\_Q}$ of the differential amplifier 3b are applied to a first Q-component modulation unit 6c and a second Q-component modulation unit 6d, respectively, to modulate optical path lengths of two arms of the Q-component MZ optical modulator 2b in a push-pull fashion.

If the $\pm V_{data\_I}$ and the $\pm V_{data\_Q}$ are intensity modulation signals with n-values, modulated light output from the IQ optical modulator M is a QAM signal with an $n^2$-value. However, in order to perform correct modulation, it is necessary to precisely adjust the optical path length of each MZI so that the two light beams interfering in each MZI have a correct optical phase difference. Generally, three types of bias voltages are used for this adjustment. In the present application, Bias_I denotes a bias voltage for controlling the optical path length of the I-component MZ optical modulator 2a, Bias_Q denotes a bias voltage for controlling the optical path length of the Q-component MZ optical modulator 2b, and Bias_Ph denotes a bias voltage for controlling the optical path length of the parent MZI.

In order that the bias voltage is reflected in the optical path length, for example, a Pockels effect may be effected within each MZI, or each of the bias voltages may be applied to a heater arranged closely to an optical waveguide to thermally expand the optical waveguide.

The Bias_I and the Bias_Q are adjusted so that the I-component MZ optical modulator 2a and the Q-component MZ optical modulator 2b are biased to a null point. That is, the optical path length is adjusted so that optical outputs of the I-component MZ optical modulator 2a and the Q-component MZ optical modulator 2b are extinguished at a moment when the $V_{data\_I}=V_{data\_Q}=0$ is established.

In an example of FIG. 12, Bias_I generated and output by a Bias_I voltage generator 7a adjusts the optical path length of the I-component MZ optical modulator 2a via a Bias_I phase adjusting means 8a and biases the I-component MZ optical modulator 2a to the null point. Output of Bias_Q generated and output by a Bias_Q voltage generator 7b adjusts the optical path length of the Q-component MZ optical modulator 2b via a Bias_Q phase adjusting means 8b, and biases the Q-component MZ optical modulator 2b to the null point. In this example, the optical path lengths of one of the two arms of the I-component MZ optical modulator 2a and one of the two arms of the Q-component MZ optical modulator 2b are controlled, but configuration may be that the optical path lengths of all the four arms are controlled to control two sets of optical path lengths in a push-pull fashion.

The adjustment of the optical path length of the parent MZI is selected so that optical phases of modulated light output from each of the MZ optical modulators are orthogonal. That is, at a moment when neither the $V_{data\_I}$ nor the $V_{data\_Q}$ is not 0, the optical path length of the parent MZI is selected so that an optical phase difference between output light of the I-component MZ optical modulator 2a and output light of the Q-component MZ optical modulator 2b, which are observed in the signal output port 301, is $\pm\pi/2$. Either a plus sign or a minus sign may be selected with an exception of a special exception, and this exception will be described in a second embodiment.

Bias_Ph generated and output by a Bias_Ph voltage generator 7c adjusts the optical path length of the parent MZI via a Bias_Ph phase adjusting means 8c to maintain the orthogonality.

In a real optical modulator, an optimum value of each bias voltage is not uniquely obtained and changes over time due to a temperature variation or other reasons. This phenomenon is called a bias drift. If the bias drift is left unprocessed, an optical signal is deteriorated to such an extent that the optical signal cannot be demodulated, and thus, auto bias control (ABC) (automatic bias voltage control) in an in-service state is essential. It is known that a bias drift of a semiconductor type optical modulator is very small as compared to that of an LN type optical modulator, but an optimum value of a bias depends on a wavelength of CW light to some extent, and thus, when a wavelength channel is changed, it may be necessary to promptly reselect an optimum bias voltage by using the ABC.

A plurality of solutions for performing the ABC in the IQ optical modulator are proposed in the past (see, NPLs 1 to 4, for example). In any of the technologies, modulated light modulated by an IQ optical modulator is extracted from a monitor port, the output light from the monitor port is electrically converted by a photodetector to obtain a monitor signal, and information on the modulated light obtained from the monitor signal is referred to realize the ABC. Generally, the information on the modulated light includes a light intensity of the modulated light or a low-speed dither signal component superimposed on the light intensity. Note that the light intensity as used herein indicates an average intensity of modulated light obtained in an average time sufficiently longer than a symbol cycle of the optical QAM signal but sufficiently shorter than a cycle of a dither signal.

If a band of the photodetector is close to a baud rate of the QAM signal, not only the light intensity of the modulated light but also high-speed modulation components derived from the modulation signals Data_I and Data_Q are extracted from the monitor signal, a peak value or an effective value (a root mean square: RMS) of the high-speed modulation component or a parameter equivalent thereto is referred to realize the ABC.

Here, there are two approaches to realize a monitor port in which modulated light is monitored. FIG. 13 and FIG. 14 are diagrams illustrating these two approaches. FIG. 13 illustrates an approach identical in configuration to that illustrated in FIG. 12, where one of two output ports provided in the optical multiplexing and demultiplexing unit 201 is used as the monitor port 302. FIG. 14 illustrates the other approach. In this approach, instead of the optical multiplexing and demultiplexing unit 201, an optical multiplexing unit 202 and an optical branch unit 203 are employed, the optical branch unit 203 branches output light multiplexed by the optical multiplexing unit 202, and one of the branched light beams is used as the monitor port.

The second approach illustrated in FIG. 14 has a disadvantage that the light intensity output from the IQ optical modulator M is lost due to an optical loss of the optical branch unit 203. An optical electric field of the output from the optical multiplexing unit 202 is defined as $E_{OUT}$, and optical electric fields of the two outputs from the optical branch unit 203 are defined as $k_1 \times E_{OUT}$ and $k_2 \times E_{OUT}$, respectively, where absolute values of $k_1$ and $k_2$ are always less than 1. The absolute value of $k_1$ needs to be close to 1 in order to increase the light intensity of a transmission signal, and the absolute value of $k_2$ approaches 0 on the basis of the law of conservation of energy. Thus, the light intensity output from the monitor port decreases, and a signal-to-noise (SN) ratio of a signal received by an ABC circuit deteriorates. This increases a control error of the ABC. In addition, in the approach illustrated in FIG. 14, the optical branch unit 203 needs to be provided additionally. Thus, the approach illustrated in FIG. 14 has another disadvantage that a circuit size increases compared to the approach in FIG. 13.

Thus, it is desirable to perform the ABC by using the optical multiplexing and demultiplexing unit 201 and the monitor port 302 illustrated in FIG. 12 and FIG. 13. However, as described above, it should be noted that the optical electric field $E_{MON}$ output from the monitor port 302 is not the same as the optical electric field $E_{OUT}$ output from the signal output port 301. This difference theoretically occurs, and also occurs even in a case of an ideal MZI where manufacturing errors are ignored. The difference between these optical electric fields and the presence or absence of an influence on the ABC will be specifically described below.

It is assumed that the IQ optical modulator M generates a quaternary quadrature amplitude modulation (QAM) signal, that is, a quadrature phase shift keying (QPSK). In this case, the $V_{data\_I}$ and the $V_{data\_Q}$ in FIG. 12 are binary drive signals. Here, it is assumed that the IQ optical modulator M and a drive signal waveform are ideal and a manufacturing error or a waveform distortion does not exist. Each bias is set to an optimum value that satisfies the above condition. That is, the I-component MZ optical modulator 2a and the Q-component MZ optical modulator 2b are biased to the null point by Bias_I and Bias_Q, respectively, and the optical path length of the parent MZI maintains the above orthogonality by Bias_Ph.

At this time, the optical electric field $E_{OUT}$ output from the signal output port 301 is a vector composition of an optical electric field EI derived from the output of the I-component MZ optical modulator 2a and an optical electric field EQ derived from the output of the Q-component MZ optical modulator 2b. The I-component MZ optical modulator 2a is modulated by $\pm V_{data\_I}$ in a push-pull fashion, and the Q-component MZ optical modulator 2b is modulated by $\pm V_{data\_Q}$ in a push-pull fashion, respectively. Thus, both of the optical electric field EI and the optical electric field EQ have two values including a positive value and a negative value. Thus, a constellation having four symbols is drawn as a result of the vector compositions. FIG. 15(a) is a schematic diagram illustrating the constellation in which these four symbols of the optical electric field $E_{OUT}$ are drawn. If an optical phase difference between the optical electric field EI and the optical electric field EQ observed at the signal output port 301 is defined as $\theta_{OUT}$, $\theta_{OUT}=\pm/2$ (hereinafter, the unit of phase is radian) is established in this example.

On the other hand, the optical electric field $E_{MON}$ output from the monitor port 302 is also a vector composition of the optical electric field EI and the optical electric field EQ, but the optical phase difference $\theta_{MON}$ between the optical electric field EI and the optical electric field EQo is $\theta_{OUT}+\pi=-\pi/2$. FIG. 15(b) is a schematic diagram illustrating a constellation in which four symbols of the optical electric field $E_{MON}$ output from the monitor port 302 are drawn. In FIG. 15(b), the symbols corresponding to those in FIG. 15(a) use the same symbol. The constellations illustrated in FIGS. 15(a) and 15(b) differ in symbol arrangement, but the shapes of the symbols are identical. Thus, the light intensity output from the signal output port 301 and the light intensity output from the monitor port 302 are the same (difference in optical loss due to manufacturing errors and the like are ignored). For the same reason, the peak value or a root mean square (RMS) value derived from the high-speed modulation component measured in the monitor port 302 is the same as that measured in the signal output port 301.

In FIGS. 15(a) and 15(b), bias settings to the IQ optical modulator M are all optimal, where the modulated light has the following three properties: Firstly, the constellation shape either in the signal output port 301 or in the monitor port 302 is four-fold symmetrical. Secondly, the light intensity is an extreme value either in the monitor port 302 or in the signal output port 301. Whether the extreme value is a maximum or a minimum depends on a multi-level number and an amplitude of the drive waveform. The details are described in NPL 1, but the details are complicated, and thus, such a description is omitted herein. Unless otherwise indicated in the following description, the description proceeds on the assumption that the light intensity is minimized if each bias is optimized. Thirdly, either in the monitor port 302 or in the signal output port 301, a peak value or an RMS value from the high-speed modulation is minimized.

The constellation illustrated in FIG. 15(a) and the constellation illustrated in FIG. 15(b) have a phase conjugate relationship, and with the exception of the special case mentioned above, the both constellations have the optimum signal quality, and thus, there is no problem even if the transmission is performed by the optical electric field $E_{MON}$ instead of the optical electric field $E_{OUT}$.

Here, if any one of the three types of biases drifts, any of the three properties described above will not be satisfied. Thus, it is possible to achieve the ABC by monitoring the output of the monitor port 302 and adjusting each bias so that the above-mentioned three types of properties are satisfied, and to maintain a signal quality of an optical QAM to be transmitted at the optimum level.

As a specific example, a case is assumed in which both of two of the three types of bias, Bias_Q and Bias_Ph, are bias-drifted, and only Bias_I is maintained at an optimum value. FIG. 16(a) is a schematic diagram illustrating a constellation in which symbols of the optical electric field $E_{OUT}$ output from the signal output port 301 in the case are drawn, and FIG. 16(b) is a schematic diagram illustrating a constellation in which symbols of the optical electric field $E_{MON}$ output from the monitor port 302 in the case are drawn. These two constellations have different symbol arrangements, and the orthogonality between the optical electric field EI and the optical electric field EQ is not maintained. However, a distance of each of the symbols from the origin in FIG. 16(a) is the same as a distance of each of the symbols from the origin in a case where the "star" is replaced with "triangle", and "round" is replaced with "square" in FIG. 16(b). Thus, the light intensity output from the signal output port 301 and the light intensity output from the monitor port 302 are the same. For the same reason, the peak value or the RMS value derived from the high-speed modulation component measured in the monitor port 302 is the same as that measured in the signal output port 301. However, an observation time needs to be sufficiently long so as to hide a pattern dependency.

Thus, if the modulated light output from the monitor port 302 is monitored and ABC is performed so that the three types of biases are sequentially close to the optimum values, it is possible to maintain the signal quality of the optical QAM signal output from the signal output port 301. A more general bias adjustment procedure is described, for example, in PTL 1.

CITATION LIST

Patent Literature

PTL 1: JP 5671130 B1

Non Patent Literature

NPL 1: H. Kawakami, and three other authors, "Auto bias control technique for optical 16-QAM transmitter with asymmetric bias dithering", Optics Express, 2011, Vol. 19, No. 26, B308-8312

NPL 2: H. Kawakami, and four other authors, "Auto bias control and bias hold circuit for IQ-modulator in flexible optical QAM transmitter with Nyquist filtering", Optics Express, 2014, Vol. 22, No. 23, p. 28163-28168

NPL 3: S. Pak, and another author, "Bias Control for Optical OFDM Transmitters", IEEE Photonics Technology Letters, 2010, Vol. 22, No. 14, p. 1030-1032

NPL 4: H. Kawakami, and two other authors, "Drive-amplitude-independent Auto Bias Control Circuit for QAM Signals and Its Demonstration with an InP-based IQ Modulator", ECOC2016; 42nd European Conference and Exhibition on Optical Communications, 2016, W.4.P1.SC4, p. 815-817

SUMMARY OF THE INVENTION

Technical Problem

The description so far assumes that the optical IQ modulator and the drive signal waveform are ideal. However, due to imperfection such as a manufacturing error of the MZI included in the optical IQ modulator and a distortion of the modulator drive signal, the constellation may be distorted to lose the symmetry. In this case, in particular, in a case of a QAM signal with a large multi-level number, the modulated light output from the signal output port 301 and the modulated light output from the monitor port 302 may differ greatly. Such a case will be described below by using 16-QAM.

FIG. 17 illustrates constellations obtained when the optical losses of the two arms configuring the MZI is imbalanced, in a simulated manner, for each of the I-component MZ optical modulator 2a and the Q-component MZ optical modulator 2b. It is assumed that, for ease of understanding, the optical loss has an extremely large imbalance in the simulation. In such a case, even if the $V_{data\_I}$ and the $V_{data\_Q}$ in FIG. 12 are both 0, it is not possible to completely extinguish the output light beams of the I-component MZ optical modulator 2a and the Q-component MZ optical modulator 2b, and thus, it is not possible to bias the I-component MZ optical modulator 2a and the Q-component MZ optical modulator 2b to the null point in a sense as described in the Background Art.

FIGS. 17(a) and 17(b) illustrate constellations obtained when the Bias_I and the Bias_Q are set so that the intensities of the output light beams from the I-component MZ optical modulator 2a and the Q-component MZ optical modulator 2b are minimum when the $V_{data\_I}=V_{data\_Q}=0$ is established. FIG. 17(a) corresponds to the optical electric field $E_{OUT}$ output from the signal output port 301, and FIG. 17(b) corresponds to the optical electric field $E_{MON}$ output from the monitor port 302.

As a result of a mutual interference of the not perfectly extinguished light with the QAM signal, the constellation bends like a bow, and no matter how the Bias_Ph is selected, the constellation is not square. The two constellations illustrated in FIGS. 17(a) and 17(b) have a mirror image relationship. Thus, the output light intensity and the RMS value from the high-speed modulation component in the monitor port 302 are the same as those in the signal output port 301. FIG. 17(b) illustrates an output light intensity together with the RMS value from the high-speed modulation component obtained by the simulation. The units are arbitrary units (arb.). These values are not minimum values. Further, in the both constellations, some of the symbols contact axes of the optical electric field EI and the optical electric field EQ, and thus, the signal quality is poor.

Next, a case is assumed in which under a condition that the same imbalance IQ optical modulator as that of FIG. 17 is used, the output light in the monitor port 302 is referred to, and the ABC is performed by using the conventional technologies described in NPLs 1 to 4. At this time, each bias is controlled so that the output light intensity or the RMS value in the monitor port 302 is minimized and that the symbol arrangement in the constellation is close to four-fold symmetry.

FIGS. 18(a) and 18(b) illustrate a constellation of the optical electric field $E_{OUT}$ of the signal output port 301 and a constellation of the optical electric field $E_{MON}$ of the monitor port 302, obtained by simulation.

A target on which the ABC is performed is the output in the monitor port 302, and thus, the constellation of FIG. 18(b) is greatly improved as compared with that of FIG. 17(b). The output light intensity and the RMS value from the high-speed modulation component are 0.490 and 0.318 (arbitrary unit), respectively, which are smaller than those in FIG. 17(b). As a result, a center of the constellation substantially matches a center of a phase space. A value different in Bias_Ph from that in FIG. 17(b) is selected in the process of suppressing a bowing distortion of the constellation and the constellation rotates, but the rotation is removed in the process of demodulation, and thus, deterioration of a signal quality does not occur.

However, for the output in the signal output port 301 to be used as a transmission signal, a symbol in a second row from the bottom and in a second column from the right shifts to a quadrant different from a position where the symbol should be present, as illustrated in FIG. 18(a), and as a result, the signal quality deteriorates so greatly that the signal can not demodulated. Correspondingly, the output light intensity and the RMS value from the high-speed modulation component also greatly increase to 0.975 and 0.723 (arbitrary unit), respectively.

As described above, under a condition that an imperfection of the IQ optical modulator or the drive signal cannot be ignored, if the conventional ABC is performed by using the monitor port of a type illustrated in FIG. 13, there is a problem that the signal quality of a transmission signal is deteriorated.

In view of the above circumstances, an object of the present invention is to provide an automatic bias control circuit capable of suppressing deterioration of a signal quality of a transmission signal output from an optical transmitter, under a condition that it is not possible to ignore an imperfection of the optical transmitter using an MZI.

Means for Solving the Problem

One aspect of the present invention is an automatic bias control circuit for controlling a bias voltage or a bias power applied to an in-phase/quadrature (IQ) optical modulator, in which the IQ optical modulator includes an optical branch unit configured to branch continuous light into two being in-phase component light and quadrature component light, an in-phase component MZ optical modulator being a Mach-Zehnder interferometer, the in-phase component MZ optical modulator configured to modulate the in-phase component light obtained by branching the continuous light by the optical branch unit, a quadrature component MZ optical modulator being a Mach-Zehnder interferometer, the quadrature component MZ optical modulator configured to modulate the quadrature component light obtained by branching the continuous light by the optical branch unit, and an optical multiplexing and demultiplexing unit configured to branch an optical quadrature amplitude modulation (QAM) signal obtained by multiplexing modulated light output from the in-phase component MZ optical modulator and modulated light output from the quadrature component MZ optical modulator after a phase adjustment unit adjusts an optical phase between the modulated light output from the in-phase component MZ optical modulator and the modulated light output from the quadrature component MZ optical modulator, and output the branched signals from each of a signal output port and a monitor port, the automatic bias control circuit includes an in-phase component bias power source configured to generate a voltage or a current applied to the in-phase component MZ optical modulator to bias the in-phase component MZ optical modulator and the quadrature component MZ optical modulator to an area near a null point, a quadrature component bias power source configured to generate a voltage or a current applied to the quadrature component MZ optical modulator to bias the in-phase component MZ optical modulator and the quadrature component MZ optical modulator to an area near a null point, a phase adjustment bias power source configured to generate a voltage or a current to determine a change amount of the optical phase applied by the phase adjustment unit, a monitor unit configured to monitor the optical QAM signal output from the monitor port, and a control unit configured to control, based on a monitor result from the monitor unit, a voltage or a current generated from each of the in-phase component bias power source, the quadrature component bias power source, and the phase adjustment bias power source, and the control unit performs a first-stage process of controlling a voltage or a current generated from each of the in-phase component bias power source, the quadrature component bias power source, and the phase adjustment bias power source so that a signal quality of the optical QAM signal obtained from the monitor result approaches a target quality, in startup sequences of the IQ optical modulator, and a second-stage process of obtaining a voltage or a current by changing a voltage or a current output from the phase adjustment bias power source by a predetermined change amount $\Delta Bias\_Ph$, after a completion of the first-stage process.

One aspect of the present invention is the automatic bias control circuit in which the monitor unit monitors at least one of an average intensity, a peak intensity, or an RMS value of the optical QAM signal output from the monitor port, and the control unit controls, in the first-stage process, a voltage or a current generated from each of the in-phase component bias power source, the quadrature component bias power source, and the phase adjustment bias power source so that the monitor result approaches a maximum or a minimum.

One aspect of the present invention is the automatic bias control circuit further including a dithering unit configured to apply dithering to at least one of an output of the in-phase component bias power source, an output of the quadrature component bias power source, an output of the phase adjustment bias power source, a modulation efficiency of the in-phase component MZ optical modulator, or a modulation efficiency of the quadrature component MZ optical modulator, in which the monitor unit monitors at least one of an average intensity, a peak intensity, or an RMS value of the optical QAM signal output from the monitor port, and the control unit synchronously detects, in the first-stage process, a dither component with a frequency fd or a higher harmonic wave of the dither component superimposed on the monitor result obtained when a dithering at a constant frequency fd is applied by the dithering unit, and controls a voltage or a current generated from each of the in-phase component bias power source, the quadrature component bias power source, and the phase adjustment bias power source so that an absolute value of the synchronous detection result approaches a maximum or 0.

One aspect of the present invention is the automatic bias control circuit in which the change amount $\Delta Bias\_Ph$ is an amount by which an optical phase is changed, by the phase adjustment unit, by $\pi$ radian.

One aspect of the present invention is the automatic bias control circuit in which the monitor unit monitors at least one of an average intensity, a peak intensity, or an RMS value of the optical QAM signal output from the monitor port, and the control unit performs, in the startup sequences, a third-stage process of recording, as a new target value, a result obtained by monitoring the optical QAM signal by the monitor unit, into a memory, after a completion of the second-stage process, regularly compares the monitor result with the target value stored in the memory after a completion of the third-stage process, and controls, if a deviation is detected as a result of the comparison, a voltage or a current generated from each of the in-phase component bias power source, the quadrature component bias power source, and the phase adjustment bias power source so that the monitor result approaches the target value.

One aspect of the present invention is the automatic bias control circuit further including a dithering unit configured to apply dithering to at least one of an output of the in-phase component bias power source, an output of the quadrature component bias power source, an output of the phase adjustment bias power source, a modulation efficiency of the in-phase component MZ optical modulator, or a modulation efficiency of the quadrature component MZ optical modulator, in which the monitor unit monitors at least one of an average intensity, a peak intensity, or an RMS value of the optical QAM signal output from the monitor port, and the control unit synchronously detects, in the startup sequences and after a completion of the second-stage process, a dither component with a frequency fd or a higher harmonic wave of the dither component superimposed on the monitor result obtained when a dithering at a constant frequency fd is applied by the dithering unit, performs a third-stage process of recording, as a new target value, the synchronous detection result, into a memory, regularly synchronously detects, after a completion of the third-stage process, a dither component with a frequency fd or a higher harmonic wave of the dither component superimposed on the monitor result obtained when a dithering at a constant frequency fd is applied by the dithering unit, compares the synchronous detection result with the target value recorded in the memory, and controls, if a deviation is detected as a result of the comparison, a voltage or a current generated from each of the in-phase component bias power source, the quadrature component bias power source, and the phase adjustment bias power source so that the synchronous detection result approaches the target value.

One aspect of the present invention is the automatic bias control circuit in which the control unit controls, in time division, a voltage or a current generated from each of the in-phase component bias power source, the quadrature component bias power source, and the phase adjustment bias power source.

One aspect of the present invention is the automatic bias control circuit in which the memory is a non-volatile memory, and the control unit finally uses the target value recorded in the memory if the third-stage process is not performed in a second or later startup sequence of the startup sequences.

One aspect of the present invention is the automatic bias control circuit further including a demodulation unit configured to demodulate the optical QAM signal output from the monitor port, in which the control unit adjusts a voltage or a current generated from each of the in-phase component bias power source, the quadrature component bias power source, and the phase adjustment bias power source, or a peripheral circuit used when a drive signal is applied to the IQ optical modulator so that a signal quality of the optical QAM signal demodulated by the demodulation unit improves.

One aspect of the present invention is the automatic bias control circuit further including a switch unit configured to select and input, into the demodulation unit, one of the optical QAM signal output from the monitor port and an optical transmission signal sent through an optical transmission path.

One aspect of the present invention is the automatic bias control circuit in which an optical transmission path from the monitor port to the demodulation unit is polarization-maintaining.

One aspect of the present invention is the automatic bias control circuit further including a wavelength change unit configured to change a wavelength of the optical QAM signal output from the monitor port and input the optical QAM signal with the changed wavelength into the demodulation unit.

Effects of the Invention

According to the present invention, it is possible to suppress deterioration of a signal quality of a transmission signal output from an optical transmitter even under a condition that it is not possible to ignore an error of an ABC monitor port derived from an imperfection of the optical transmitter using an MZI.

DESCRIPTION OF EMBODIMENTS

Hereinafter, embodiments of the present invention will be described in detail with reference to the drawings. The present embodiments relate to an error compensation of an optical monitoring circuit for an IQ optical modulator used in an optical QAM signal generation optical transmitter. In particular, the present embodiments are suitable for an error compensation of an optical monitoring circuit for use in automatic bias control of an IQ optical modulator.

Figure 1:
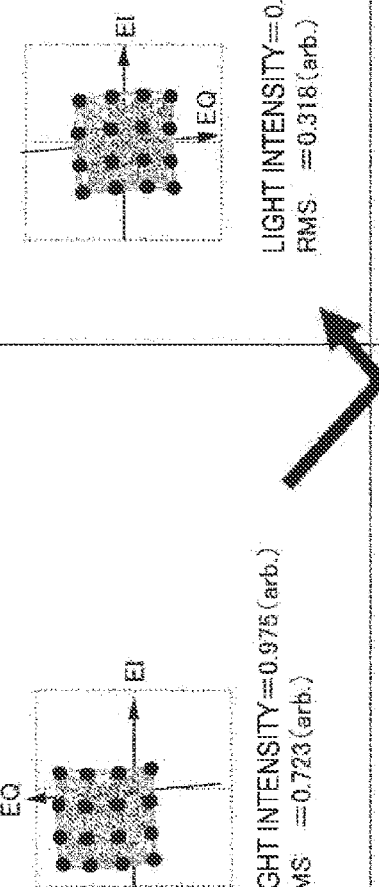
FIG. 1 is a table showing a basic effect of an error compensation method according to an embodiment of the present invention.
Figure 12:
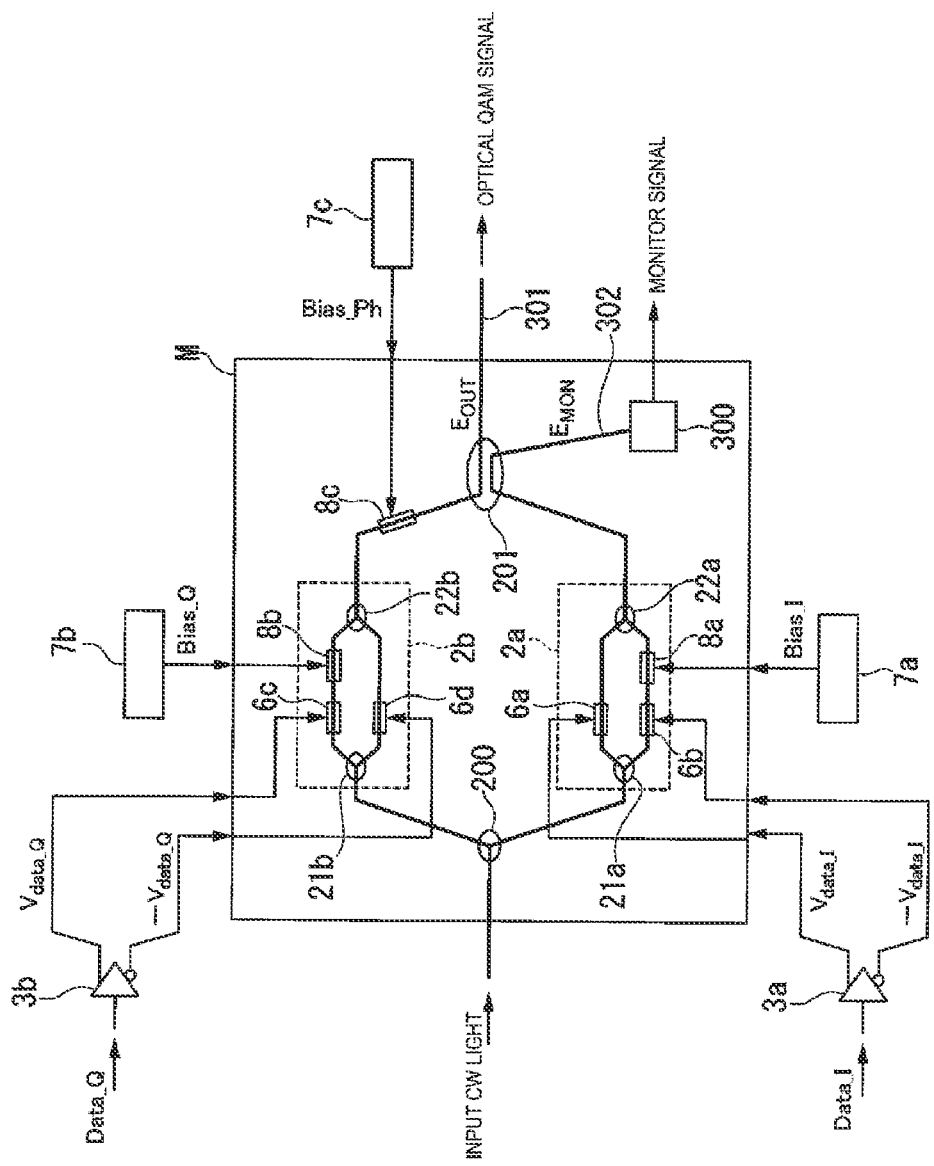
FIG. 12 is a diagram illustrating an optical QAM signal generation optical transmitter according to a conventional technology.
Figure 13:
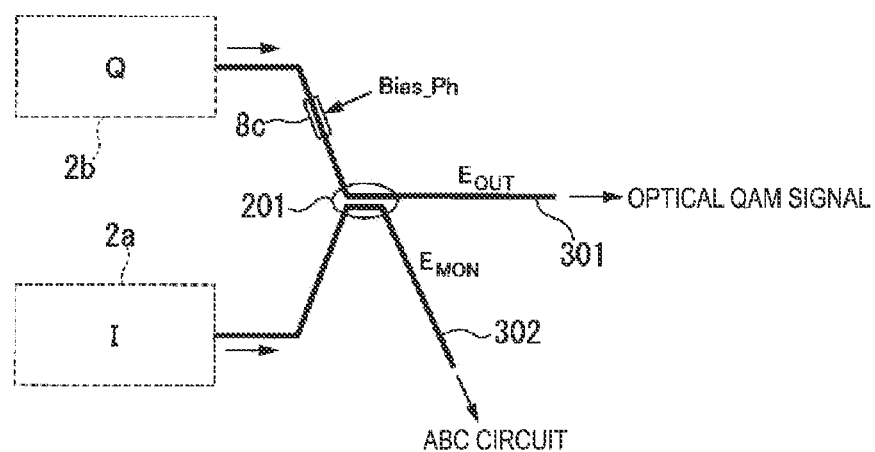
FIG. 13 is a diagram illustrating an example in which a monitor port for modulated light is realized.
Figure 14:
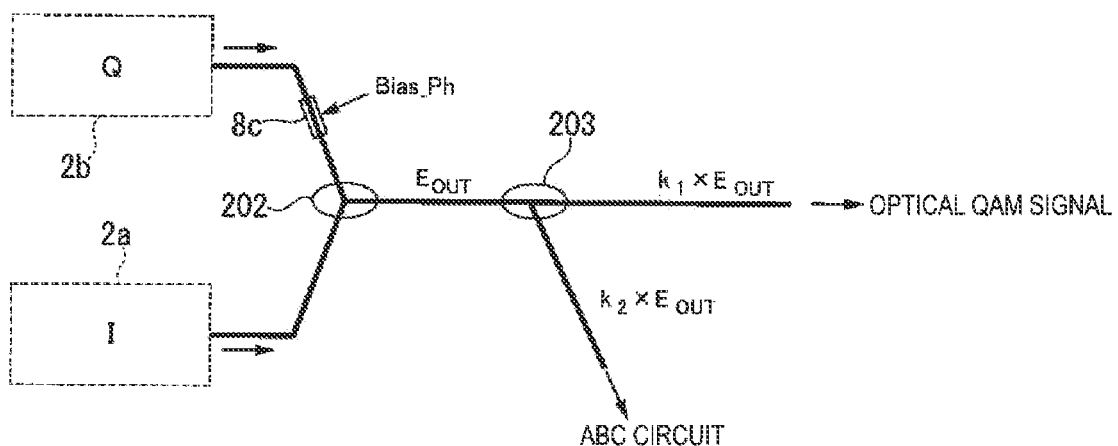
FIG. 14 is a diagram illustrating an example in which a monitor port for modulated light is realized.
Figure 15:
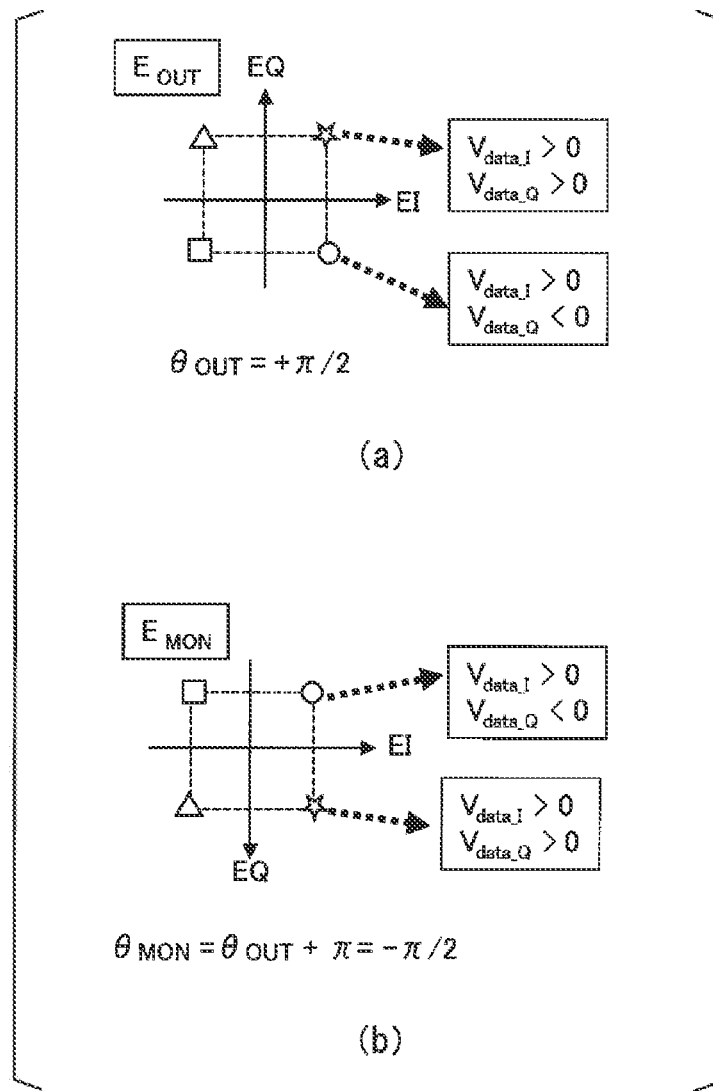
FIG. 15 is a schematic diagram illustrating constellations of optical electric fields of a signal output port and a monitor port.
Figure 16:
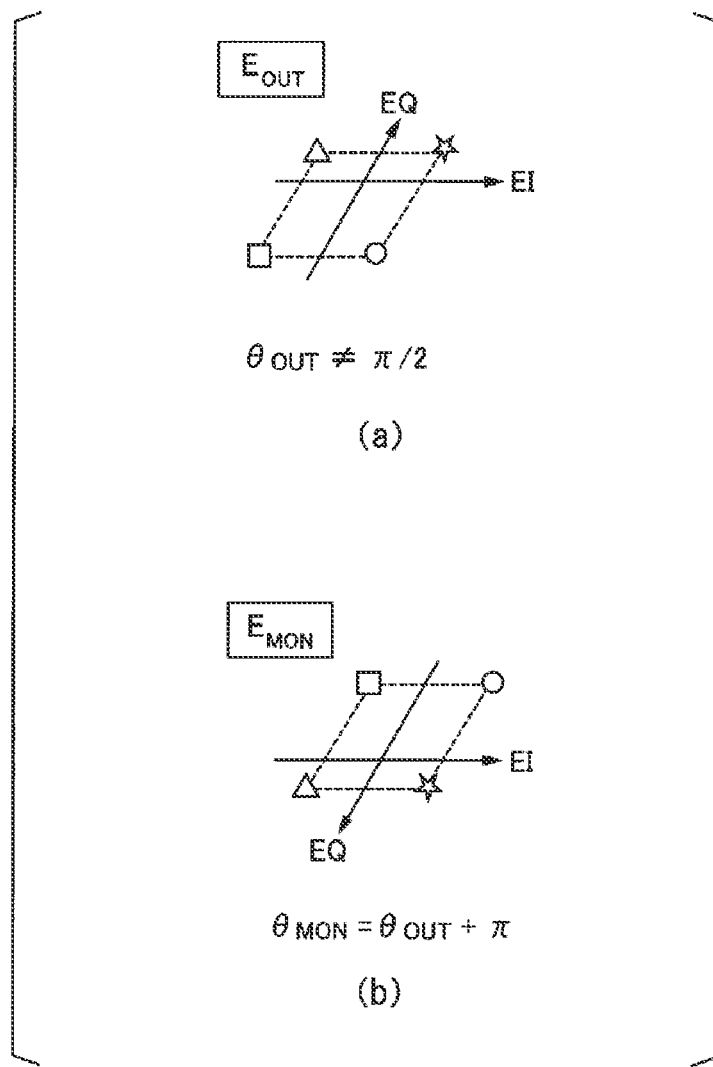
FIG. 16 is a schematic diagram illustrating constellations of optical electric fields of a signal output port and a monitor port.
Figure 17:
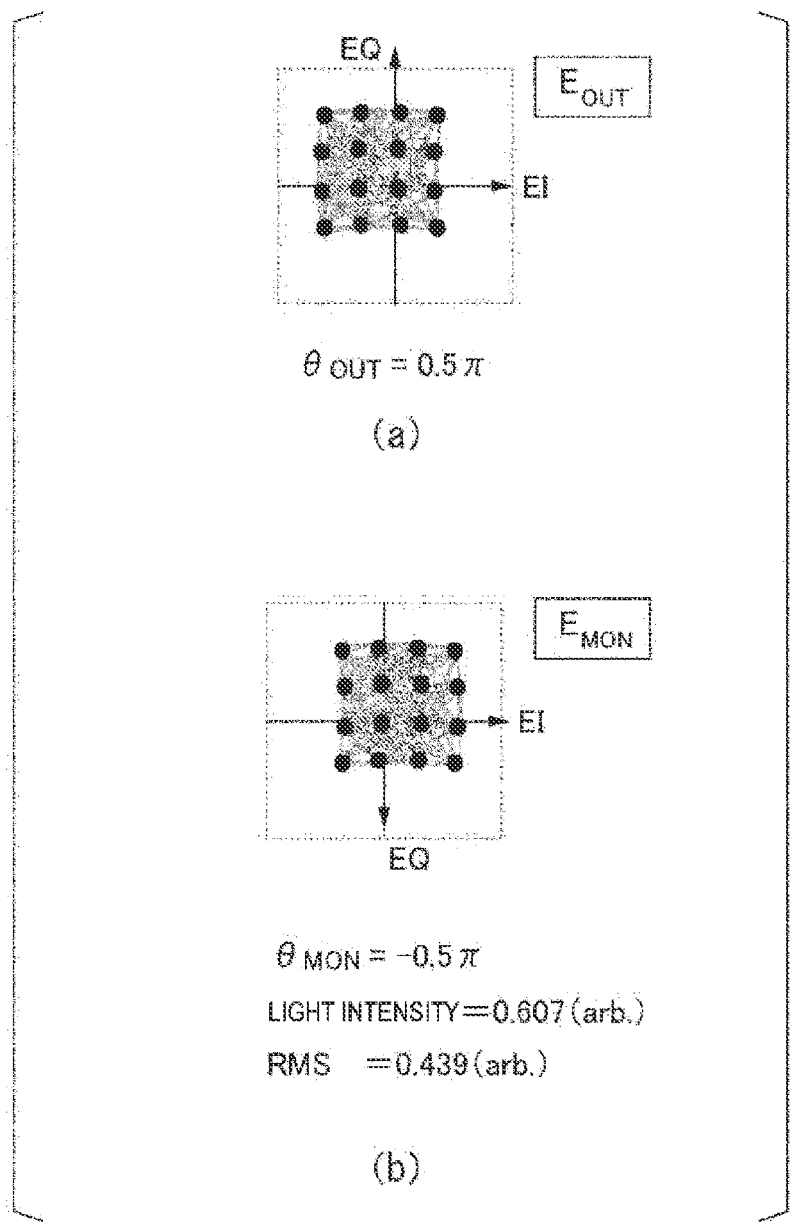
FIG. 17 is a diagram illustrating constellations of optical electric fields of a signal output port and a monitor port.

FIG. 1 shows a basic effect of an error compensation method according to the present embodiment. The error compensation method includes a plurality of steps. In the present embodiment, modulated light generated by the IQ optical modulator M illustrated in FIG. 12 is monitored according to an approach illustrated in FIGS. 2 and 3. A target to be monitored is modulated light output from the monitor port 302 illustrated in FIG. 13.

Figure 18:
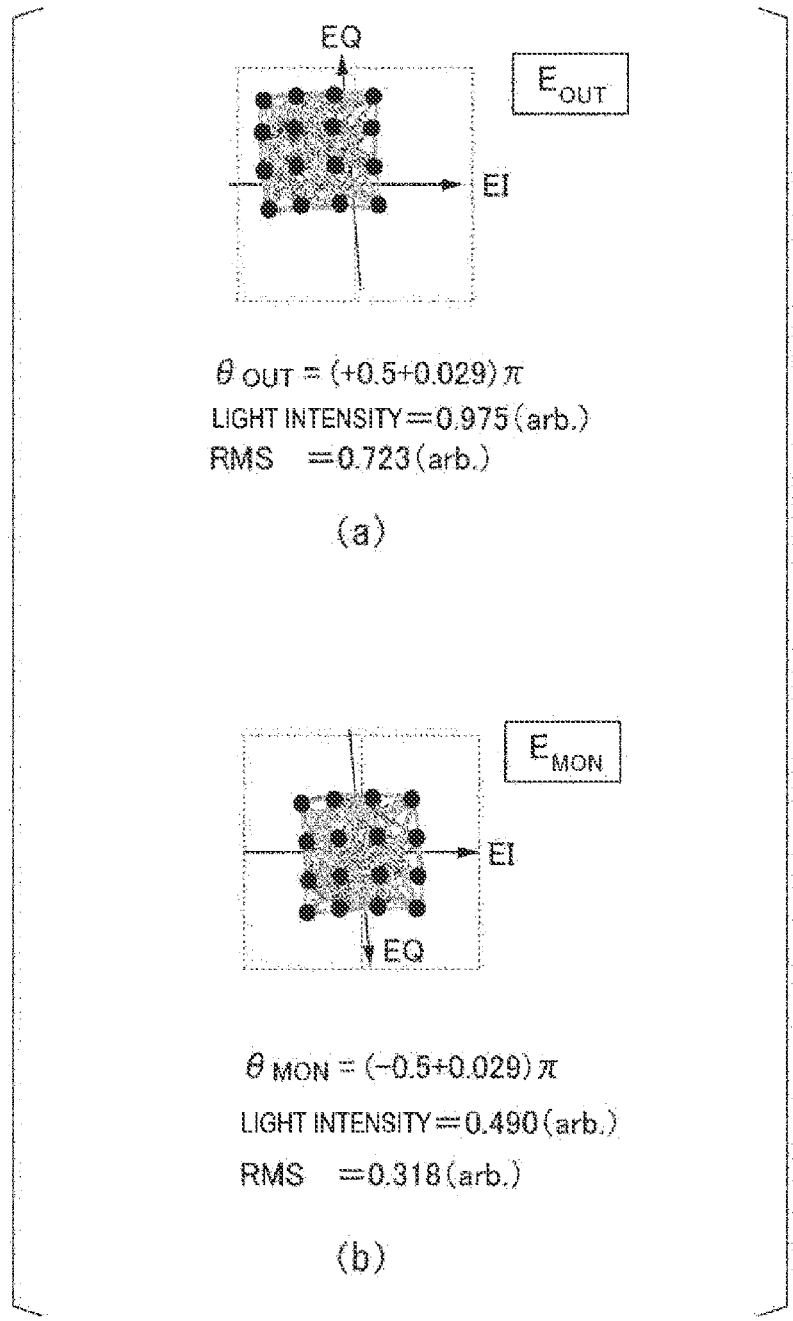
FIG. 18 is a diagram illustrating constellations of optical electric fields of a signal output port and a monitor port.

In a first step, based on a monitor result of modulated light output from the monitor port 302, ABC according to a conventional technology is performed in the present embodiment. A resulting constellation is the same as that in FIGS. 18(a) and 18(b), and such a constellation is again provided in the left column of FIG. 1. In the left column of FIG. 1, a light intensity of modulated light output from each of output ports and an RMS value derived from a high-speed modulation component obtained by simulation are shown together in arbitrary units (arb.). The upper row of FIG. 1 corresponds to the optical electric field $E_{OUT}$ from the signal output port 301. The lower row of FIG. 1 corresponds to the optical electric field $E_{MON}$ output from the monitor port 302. The intensity of light output from the monitor port 302 and the RMS value are minimum values. The light intensity is 0.490 and the RMS is 0.318.

Next, in a second step, the ABC is suspended in the present embodiment and Bias_Ph is increased or decreased by Vπ_bias. Here, Vπ_bias is a half-wavelength voltage in a bias electrode used as the Bias_Ph phase adjusting means 8c. The half-wavelength voltage indicates an increment in voltage required to increase a difference in optical path length between two arms by half the wavelength in an MZ optical modulator. The optical path length depends on both the voltage of the modulation signal ($\pm V_{data\_I}$, $\pm V_{data\_Q}$ in FIG. 12) and each bias voltage, and thus, the half-wavelength voltage may be defined in a plurality of ways. However, in the present embodiment, Vπ_bias, which is a half-wavelength voltage in Bias_Ph, indicates a change amount of Bias_Ph required to increase or decrease by half the wavelength (in other words, to change an optical phase difference $\theta_{OUT}$ by $\pm\pi$) a difference in optical path length of the parent MZI.

Note that if the optical path length is changed by heat generation of a heater, the term half-wavelength power may be used instead of the half-wavelength voltage.

It should be noted here that Vπ_bias has an extremely small drift and may be regarded as almost constant. The Bias_Ph giving $\theta_{OUT}=\pi/2$ may be defined as Bias_Ph1, and Bias_Ph giving $\theta_{OUT}=-\pi/2$ may be defined as Bias_Ph2. As described above, Bias_Ph1 and Bias_Ph2 drift over time, but drift amounts of Bias_Ph1 and Bias_Ph2 are almost the same due to periodicity of the MZI. Thus, the drift of Vπ_bias=(Bias_Ph1−Bias_Ph2) may be substantially ignored and may be regarded as a constant.

A description will be provided with reference to FIG. 1 again. At an end of the second step, the optical electric fields of the signal output port 301 and the monitor port 302 are switched as shown in the right column of FIG. 1. The constellation of the signal output port 301 is optimized. An optimized optical QAM signal is transmitted to the transmission path. On the other hand, the intensity of light output from the monitor port 302 and the RMS are not minimum anymore. The light intensity increases to 0.975 and the RMS to 0.723.

In a third step, an ABC circuit connected to the monitor port 302 is operated again in the present embodiment. In the third step, the ABC circuit controls each bias to maintain the light intensity at 0.975 and RMS at 0.723, which are values at the end of the second step, rather than to minimize the light intensity and the RMS. As a result, the transmission signal remains optimal regardless of an error in the monitor port 302.

Note that in the first step and the second step, the optical phase difference $\theta_{OUT}$ changes by $\pi$, however, this does not cause a problem in a normal optical QAM signal. This does not apply to the above special exception, but a solution for coping with this problem will be described in a second embodiment.

An optical transmitter according to each embodiment of the present invention will be described below. In the embodiments described below, the same reference signs may be assigned to the same components as the components of the optical transmitter illustrated in FIG. 12 or components in other embodiments, and duplicated descriptions thereof may be omitted.

First Embodiment

Figure 2:
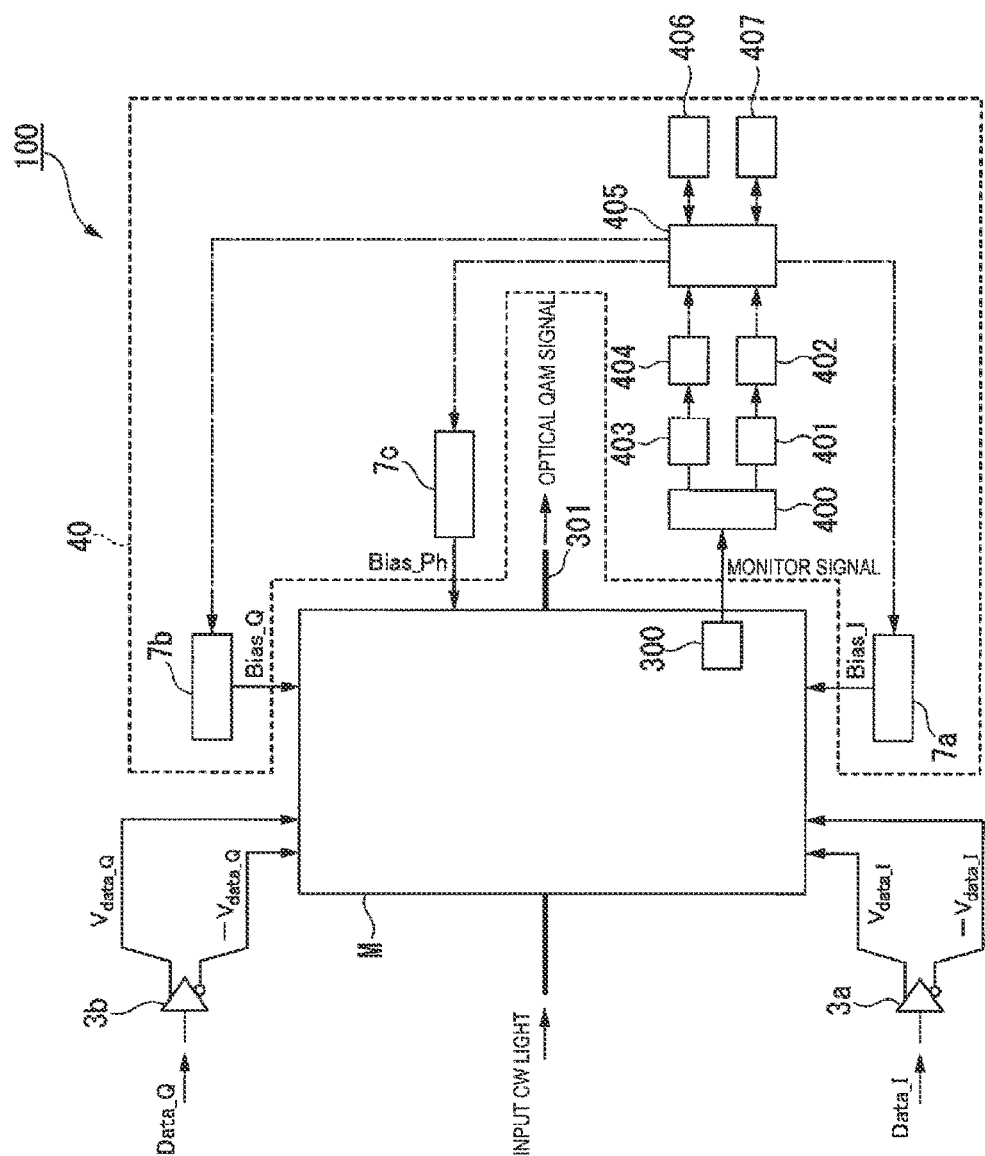
FIG. 2 is a block diagram illustrating an example of a configuration of an optical transmitter according to a first embodiment.

FIG. 2 is a block diagram illustrating an example of a configuration of an optical transmitter 100 according to a first embodiment. In FIG. 2, portions identical to those of the optical QAM signal generation optical transmitter according to the conventional technology illustrated in FIG. 12 are given the same reference signs. The optical transmitter 100 includes an IQ optical modulator M, differential amplifiers 3a and 3b, and a bias control circuit 40. The IQ optical modulator M and the differential amplifiers 3a and 3b are configured in much the same way as the IQ optical modulator M and the differential amplifiers 3a and 3b in the optical QAM signal generation optical transmitter illustrated in FIG. 12.

The bias control circuit 40 is an ABC circuit of the IQ optical modulator M. The bias control circuit 40 includes the Bias_I voltage generator 7a, the Bias_Q voltage generator 7b, the Bias_Ph voltage generator 7c, a distributor 400, a low-pass filter 401, a first analog-to-digital converter (ADC) 402, an RMS measurement circuit 403, a second ADC 404, a control processor 405, a first non-volatile memory 406, and a second non-volatile memory 407. The first non-volatile memory 406 and the second non-volatile memory 407 may be physically different non-volatile memories and may be separate storage regions on the same non-volatile memory.

The distributor 400 branches, into two, an electrical monitor signal output from an IQ modulator-incorporated photodetector 300. One of the signals branched by the distributor 400 is input to the first analog-to-digital converter (ADC) 402 through the low-pass filter 401 that attenuates a high-frequency band. The first ADC 402 converts an analog signal into a digital signal and outputs the digital signal. The output from the first ADC 402 is digital data representative of the intensity of light output from the monitor port 302. The other of the signals branched by the distributor 400 is input to the RMS measurement circuit 403. The RMS measurement circuit 403 measures the RMS of an analog signal input from the distributor 400 and then outputs the signal to the second ADC 404. The second ADC 404 converts the analog signal input from the RMS measurement circuit 403 into a digital signal and outputs the digital signal. The output of the second ADC 404 is digital data representative of an RMS value of a high-speed modulation component derived from the Data_I and the Data_Q. Note that in FIG. 2, the digital data is represented by a dot-dash line.

The digital data items output from the first ADC 402 and the second ADC 404 are each input to the control processor 405. The control processor 405 performs processing illustrated in a flowchart illustrated in FIG. 3. Through the processing, the control processor 405 sends a feedback signal to the Bias_I voltage generator 7a, the Bias_Q voltage generator 7b, and the Bias_Ph voltage generator 7c, and modifies each bias voltage for optimization. The first non-volatile memory 406 stores a value of the light intensity as a control target. The second non-volatile memory 407 stores a value of the RMS as a control target. The first non-volatile memory 406 is described as a first memory and the second non-volatile memory 407 is described as a second memory, below. The first memory and the second memory may be provided in the control processor 405.

Figure 3:
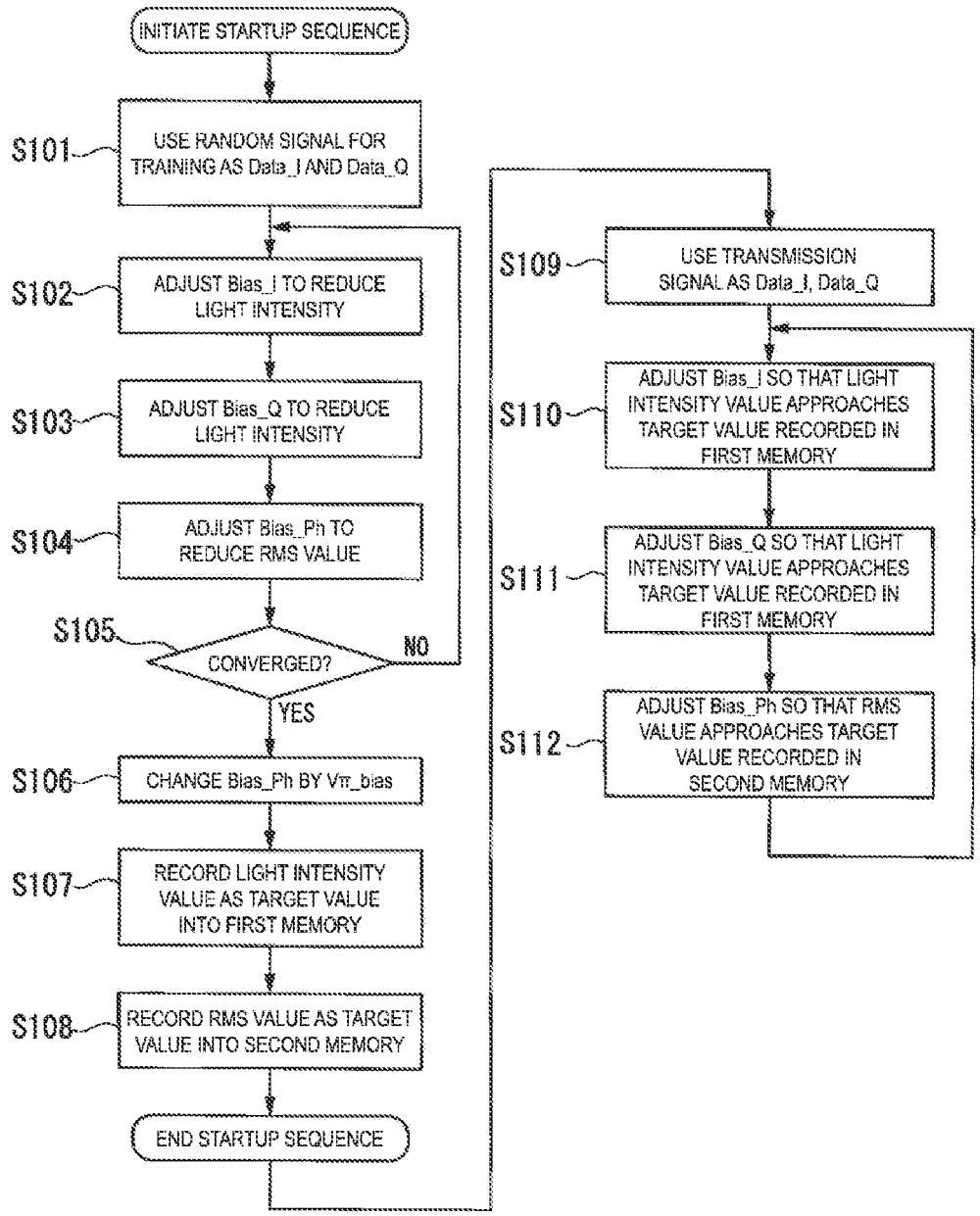
FIG. 3 is a flowchart illustrating processing of a control processor according to the first embodiment.

FIG. 3 is a flowchart illustrating processing of the control processor 405. A correction procedure in the present embodiment cannot be performed in an in-service state. Thus, the correction procedure needs to be ended during a startup sequence.

Immediately after the startup sequence begins, random signals for training are used for the Data_I and the Data_Q (step S101). The IQ optical modulator M outputs an optical QAM signal and a monitor signal generated based on these random signals. The monitor signal is converted to an electrical signal by the IQ modulator-incorporated photodetector 300 and then is branched by the distributor 400. One of the branched monitor signals is converted to a digital signal by the first ADC 402 after a high frequency component of the monitor signal is removed by the low-pass filter 401, and the digital signal is input to the control processor 405. An RMS for the other of the branched monitor signals is measured by the RMS measurement circuit 403, and then the other of the branched monitor signals is converted into a digital signal representing an RMS value by the second ADC 404, and the digital signal is input to the control processor 405. As a result of the digital signals being input, the control processor 405 obtains the light intensity and the RMS of the monitor signal. Here, as defined in the Background Art, the light intensity is the average intensity of modulated light averaged over a time sufficiently longer than a symbol cycle of the optical QAM signal. Note that the bias control circuit 40 may be configured to acquire the peak intensity instead of the RMS value. If the peak intensity is obtained, the bias control circuit 40 measures the monitor signal which does not pass through the low-pass filter.

The control processor 405 adjusts the Bias_I and the Bias_Q so that the light intensity is reduced (steps S102 and S103), and the Bias_Ph so that the RMS value or the peak intensity are minimized (step S104). The control processor 405 cyclically repeats the adjustment processing of steps S102 to step S104 until the control processor 405 determines that each of the Bias_I, the Bias_Q, and the Bias_Ph is converged (step S105: NO).

In determining that each of the biases is converged (step S105: YES), the control processor 405 changes the Bias_Ph by V$\pi$_bias (step S106). At this stage, the control processor 405 records the current light intensity as a target value into the first memory (step S107) and records the current RMS value or the peak intensity as a target value into the second memory (step S108). With these steps, the startup sequence ends, and the processing moves to in-service processing.

When the in-service processing starts, instead of the random signals for training, data signals for a transmission service are used as the Data_I and the Data_Q (step S109). The control processor 405 determines whether the monitor results of the monitor signal match the corresponding target values recorded in the first and second memories, and if a determination result indicates a mismatch (deviation by a predetermined degree or above), the control processor 405 repeats processing of controlling the Bias_I voltage generator 7a, the Bias_Q voltage generator 7b, and the Bias_Ph voltage generator 7c so that the monitor results return again to the target values. Thus, the control processor 405 obtains the light intensity and the RMS value or the peak intensity of the monitor signal, as in the above example. The control processor 405 adjusts the Bias_I so that the light intensity approaches the target value recorded in the first memory (step S110) and also adjusts the Bias_Q (step S111). Further, the control processor 405 adjusts the Bias_Ph so that the RMS value approaches the target value recorded in the second memory. The control processor 405 repeats regularly, for example, cyclically this adjustment operation in steps S110 to S112.

Second Embodiment

Figure 4:
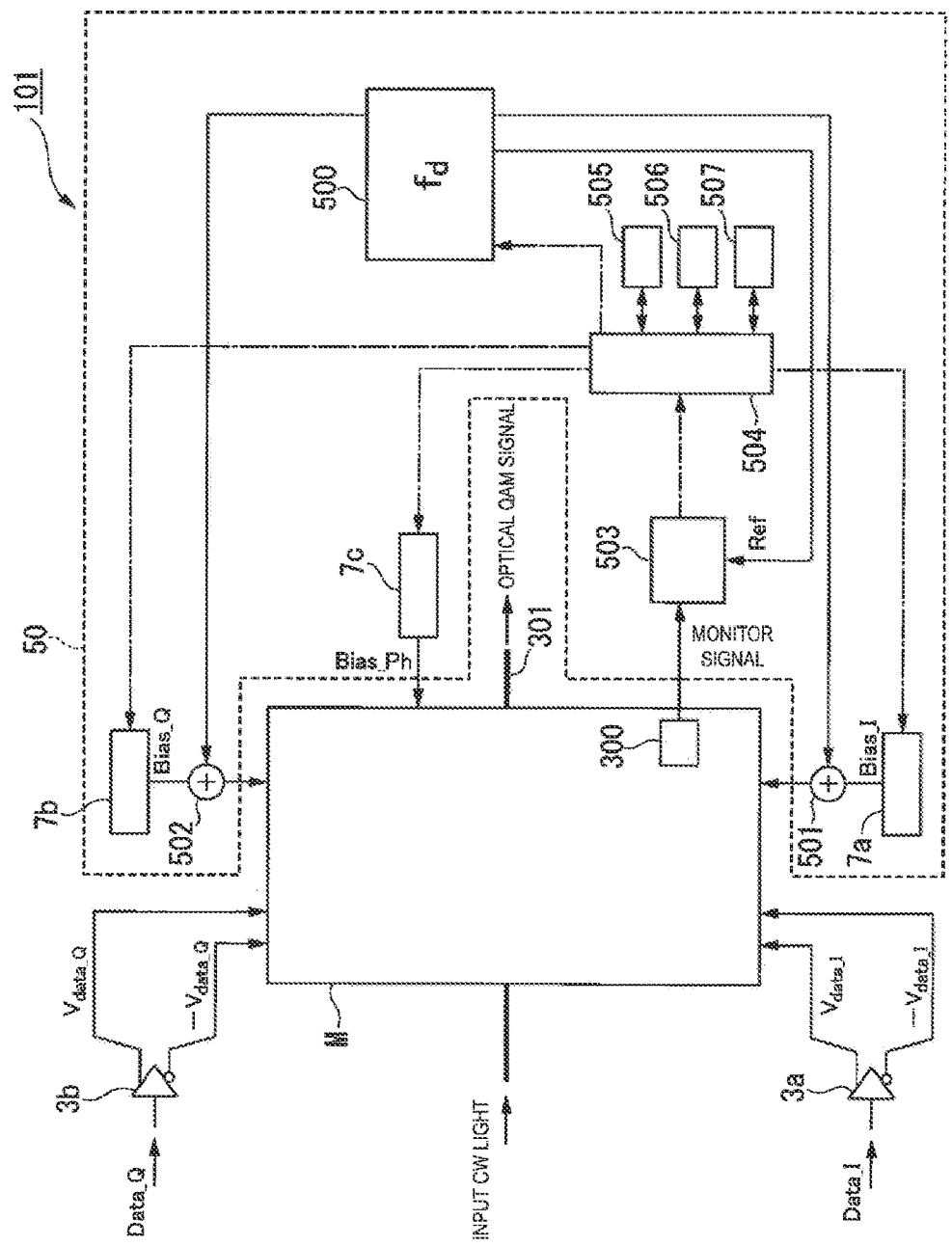
FIG. 4 is a block diagram illustrating an example of a configuration of an optical transmitter according to a second embodiment.

FIG. 4 is a block diagram illustrating an example of a configuration of an optical transmitter 101 according to a second embodiment. In FIG. 4, the same components as those of the optical transmitter 100 according to the first embodiment illustrated in FIG. 2 are denoted by the same reference signs and descriptions thereof are omitted. The optical transmitter 101 illustrated in FIG. 4 is different from the optical transmitter 100 illustrated in FIG. 2 in that the former includes a bias control circuit 50 instead of the bias control circuit 40. The bias control circuit 50 is different from the bias control circuit 40 according to the first embodiment in that the former includes a synchronous detection circuit 503 that performs a dithering by an oscillator (dither generator or dithering unit) 500 that outputs a periodic signal with a frequency fd and synchronously detects a dither signal superimposed on a monitor output.

The bias control circuit 50 includes the Bias_I voltage generator 7a, the Bias_Q voltage generator 7b, the Bias_Ph voltage generator 7c, the oscillator 500, a multiplexer 501, a multiplexer 502, the synchronous detection circuit 503, a control processor 504, a first non-volatile memory 505, a second non-volatile memory 506, and a third non-volatile memory 507. In the present embodiment, the first non-volatile memory 505 is also described as a first memory, the second non-volatile memory 506 is also described as a second memory, and the third non-volatile memory 507 is also described as a third memory. The first memory, the second memory, and the third memory may be physically different non-volatile memories and may be separate storage regions on the same non-volatile memory. The first memory, the second memory, and the third memory may be provided in the control processor 504.

The oscillator (dither generator) 500 has three outputs all having a frequency fd. The dither signals, which are the three outputs, may be individually turned on and off in accordance with instructions from the control processor 504. One of the outputs from the oscillator 500 passes through the multiplexer 501 to be used to dither the Bias_I, another of the outputs passes through the multiplexer 502 to be used to dither the Bias_Q, and the other of the outputs is used as a reference clock (Ref) of the synchronous detection circuit 503.

The multiplexer 501 multiplexes the dither signal with the frequency fd output from the oscillator 500 on the Bias_I output from the Bias_I voltage generator 7a, and applies the dithering at the frequency fd to the Bias_I. The multiplexer 502 multiplexes the dither signal with the frequency fd output from the oscillator 500 on the Bias_Q output from the Bias_Q voltage generator 7b, and applies the dithering at the frequency fd to the Bias_Q.

The synchronous detection circuit 503 receives an electrical monitor signal output from the IQ modulator-incorporated photodetector 300. The synchronous detection circuit 503 uses the reference clock at the frequency fd received from the oscillator 500 to perform a synchronous detection on the monitor signal, and inputs a synchronous detection result, as digital data, into the control processor 504. The synchronous detection circuit 503 synchronously detects a dither component to be superimposed on the monitor result of the average intensity, the peak intensity, or the RMS value of the monitor signal, or a higher harmonic wave of the dither component. According to the flowchart illustrated in FIG. 5, the control processor 504 sends a feedback signal to the Bias_I voltage generator 7a, the Bias_Q voltage generator 7b, and the Bias_Ph voltage generator 7c to modify each of the bias voltages for optimization.

Figure 5:
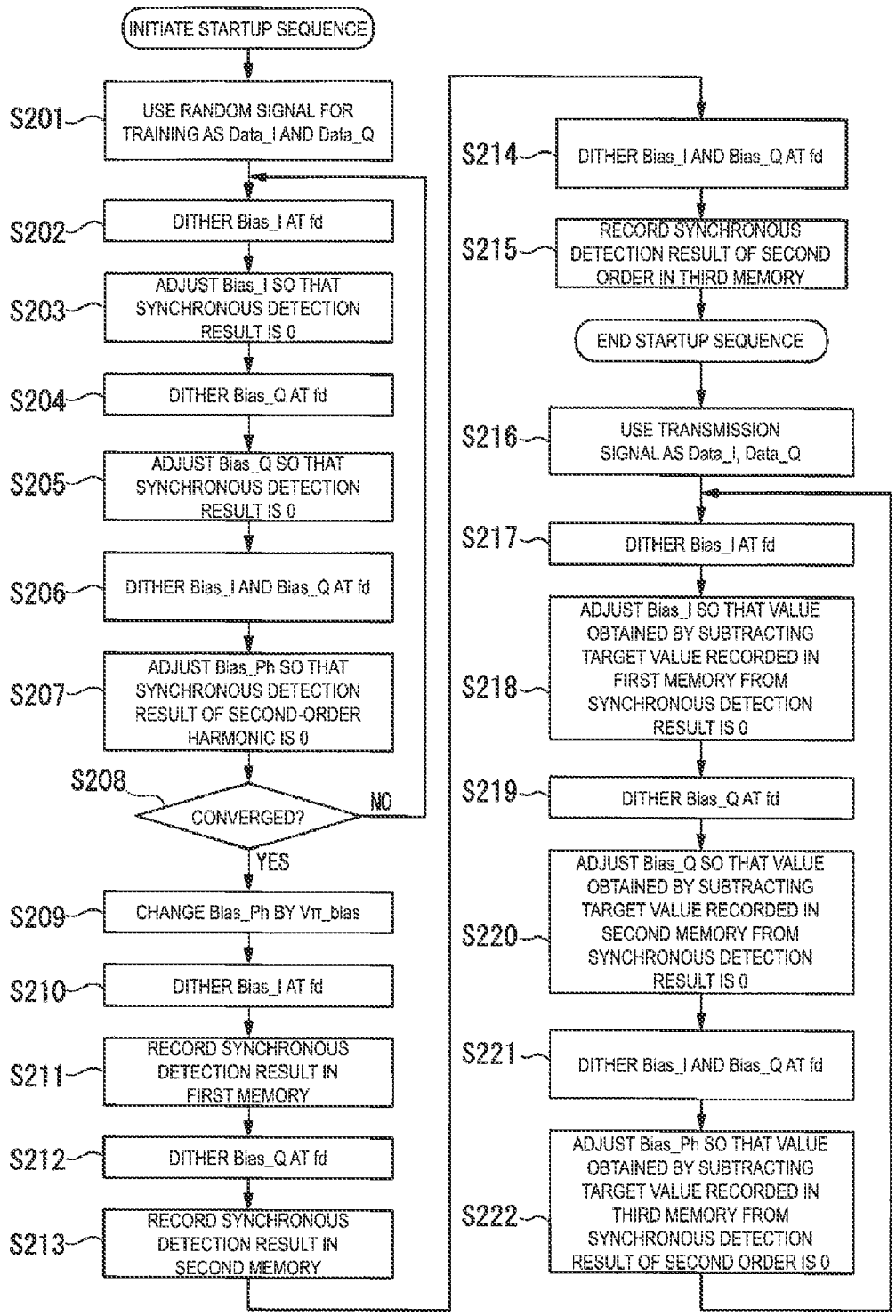
FIG. 5 is a flowchart illustrating processing of a control processor according to the second embodiment.

FIG. 5 is a flowchart illustrating processing of the control processor 504. Similarly to the first embodiment, the correction procedure needs to be ended during the startup sequence. Thus, Immediately after the startup sequence begins, random signals for training are used for the Data_I and the Data_Q (step S201). The control processor 504 sends an instruction to the oscillator 500 to dither only the Bias_I at the frequency fd (step S202). Next, the control processor 504 controls the Bias_I so that the synchronous detection result obtained by the synchronous detection circuit 503 is 0 (step S203).

Here, there are two types of zero points of the synchronous detection. That is, there are two cases where a positive value is returned and where a negative value is returned when the synchronous detection result is differentiated by Bias_I. The cases corresponds one-to-one to a case where a light output intensity in the monitor port 302 is minimized and a case where the light output intensity is maximized. Up to this point, description focuses on the control to minimize the light intensity. However, as described in NPL 1, if a multi-level number and an amplitude of a drive waveform satisfy a specific condition, the light intensity is maximum rather than minimum at an optimal bias value. Thus, of two different types of zero points of the synchronous detection, it is necessary to select a zero point corresponding to the optimal bias. This selection may be realized by appropriately selecting a loop gain of a feedback loop as described in NPL 1.

Next, the control processor 504 sends an instruction to the oscillator 500 to dither only the Bias_Q at the frequency fd (step S204). Next, the control processor 504 controls the Bias_Q so that the synchronous detection result obtained by the synchronous detection circuit 503 is 0 (step S205). The zero point may be selected in much the same way as in the case of the Bias_I.

Next, the control processor 504 sends an instruction to the oscillator 500 to dither both the Bias_I and the Bias_Q at the frequency fd (step S206). Here, the frequency of the dither signal output to the multiplexer 501 to dither the Bias_I and the frequency of the dither signal output to the multiplexer 502 to dither Bias_Q are both fd. However, these dither signals are set so that the phases differ by $\pi/2$. The control processor 504 controls the Bias_Ph so that the synchronous detection result of a second-order harmonic (2fd) obtained by the synchronous detection circuit 503 is 0 (step S207).

Here, there are two types of zero points of synchronous detection of the second-order harmonic. That is, there are two cases where a positive value is returned and where a negative value is returned when the synchronous detection result of the second-order harmonic is differentiated by Bias_Ph. As described in NPL 2, the cases correspond one-to-one to a case where the optical phase difference $\theta_{MON}$ is $+\pi/2$ and a case where the optical phase difference $\theta_{MON}$ is $-\pi/2$. In a normal optical QAM signal, either sign may be selected without any problem, but in performing a pre-equivalence with a fine adjustment of an optical phase such as a pre-chromatic dispersion, it is necessary to select an appropriate sign. If an appropriate sign is desirably selected so that the optical phase difference $\theta_{OUT}$ be $+\pi/2$ in the in-service state, the zero point where the optical phase difference $\theta_{MON}$ is $+\pi/2$ is selected instead of the optical phase difference $\theta_{OUT}$ in step S207.

The control processor 504 cyclically repeats the adjustment processing of steps S202 to step S207 until the control processor 504 determines that each bias of the Bias_I, the Bias_Q, and the Bias_Ph is converged (step S208: NO). In determining that each of the biases is converged (step S208: YES), the control processor 504 changes the Bias_Ph by V$\pi$_bias (step S209). Here, the optical electric field $E_{OUT}$ and the optical electric field $E_{MON}$ are switched as illustrated in FIG. 1, and thus, the optical phase difference $\theta_{OUT}$ is $+\pi/2$. If $-\pi/2$ is desirably selected for the optical phase difference $\theta_{OUT}$ in the in-service state, it is only required that a zero point different from the zero point described above is selected in step S207.

When step S209 ends, the control processor 504 sends an instruction to the oscillator 500 to dither only the Bias_I at the frequency fd (step S210), and records the synchronous detection result obtained by the synchronous detection circuit 503 into the first memory (step S211). Next, the control processor 504 sends an instruction to the oscillator 500 to dither only the Bias_Q at the frequency fd (step S212). The control processor 504 records the synchronous detection result obtained by the synchronous detection circuit 503 into the second memory (step S213). Next, the control processor 504 sends an instruction to the oscillator 500 to dither both the Bias_I and the Bias_Q with a phase relationship in much the same way as in step S206 (step S214). The control processor 504 records the synchronous detection result of the second-order harmonic (2fd) obtained by the synchronous detection circuit 503 into the third memory (step S215).

With these steps, the startup sequence ends. Next, processing in the in-service state starts.

When the in-service processing starts, instead of the random signals for training, data signals for a transmission service are used for the Data_I and the Data_Q (step S216). Next, the control processor 504 sends an instruction to the oscillator 500 to dither only the Bias_I at the frequency fd (step S217). The control processor 504 determines whether the synchronous detection results of the monitor signal match the corresponding target values recorded in the first to third memories. In determining a mismatch (deviation by a predetermined degree or above), the control processor 504 repeats the processing of controlling the Bias_I voltage generator 7a, the Bias_Q voltage generator 7b, and the Bias_Ph voltage generator 7c so that the synchronous detection results return again to the target values. Thus, the control processor 504 subtracts the target value recorded in the first memory from the synchronous detection results obtained by the synchronous detection circuit 503 to calculate an error signal. The control processor 504 controls the Bias_I so that the calculated error signal is close to 0 (step S218). There are two different zero points at this time, but the control processor 504 selects a zero point in the same type as that selected in step S203.

Next, the processor 504 performs a process in which the notations "I" and "first memory" in steps S217 and S218 are replaced with the notations "Q" and "second memory", and controls the Bias_Q (steps S219 and S220). That is, the control processor 504 sends an instruction to the oscillator 500 to dither only the Bias_Q at the frequency fd. The control processor 504 subtracts the target value recorded in the second memory from the synchronous detection results obtained by the synchronous detection circuit 503 to calculate an error signal. The control processor 504 controls the Bias_Q so that the calculated error signal is close to 0. At this time, the control processor 504 selects a zero point in the same type as that selected in step S205.

Next, the control processor 504 sends an instruction to the oscillator 500 to dither both the Bias_I and the Bias_Q with a phase relationship in much the same way as in step S206 (step S221). The control processor 504 controls the Bias_Ph so that a value obtained by subtracting the target value recorded in the third memory from the synchronous detection result of the second-order harmonic obtained by the synchronous detection circuit 503 is 0 (step S222). There are also two different zero points at this time, but the control processor 504 selects a zero point different in type from that selected in step S207. This is because the Bias_Ph is changed by V$\pi$_bias in step S209. After these steps, the control processor 504 repeats regularly, for example, cyclically steps S217 to S222.

Figure 6:
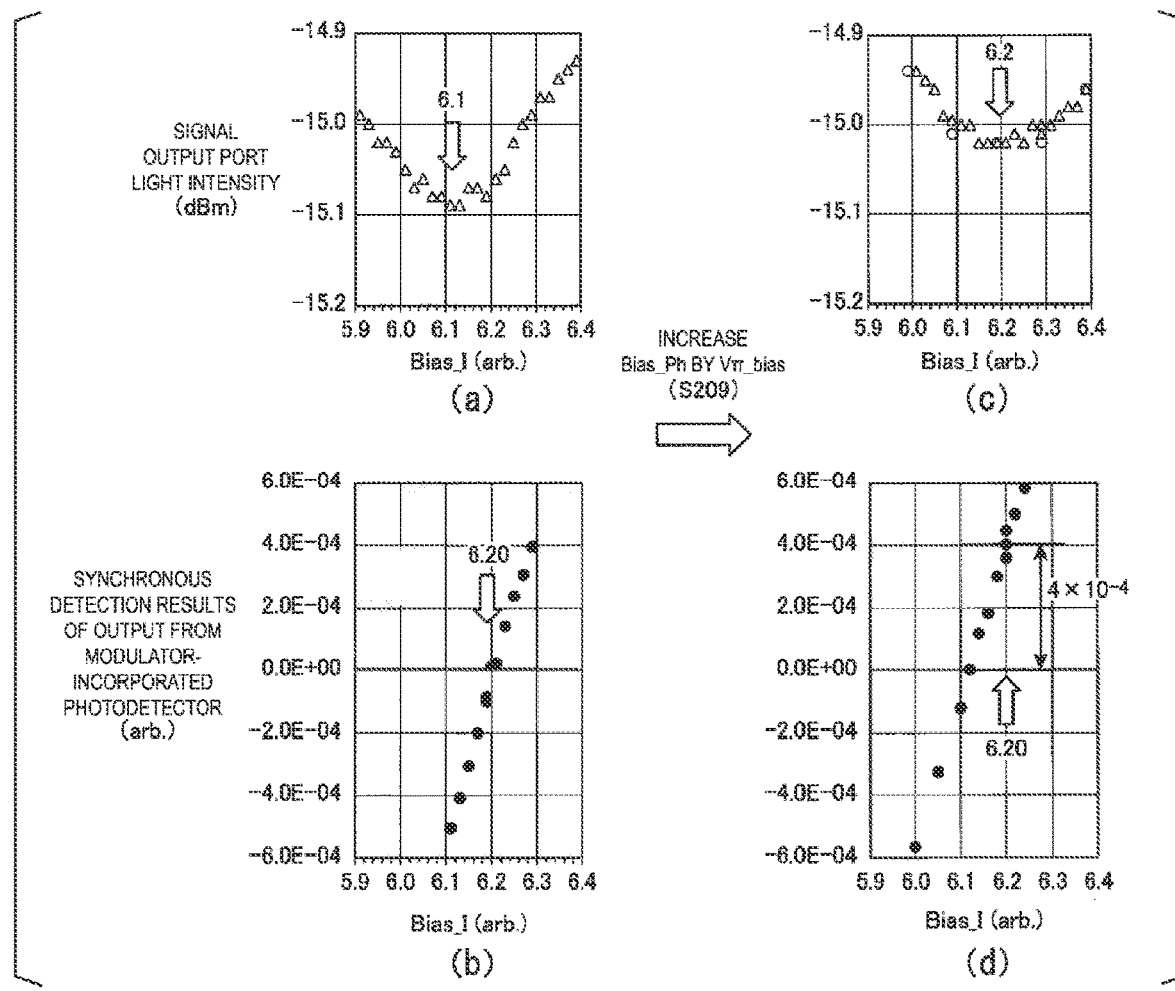
FIG. 6 is graphs illustrating a principle confirmation experiment result according to the second embodiment.
Figure 7:
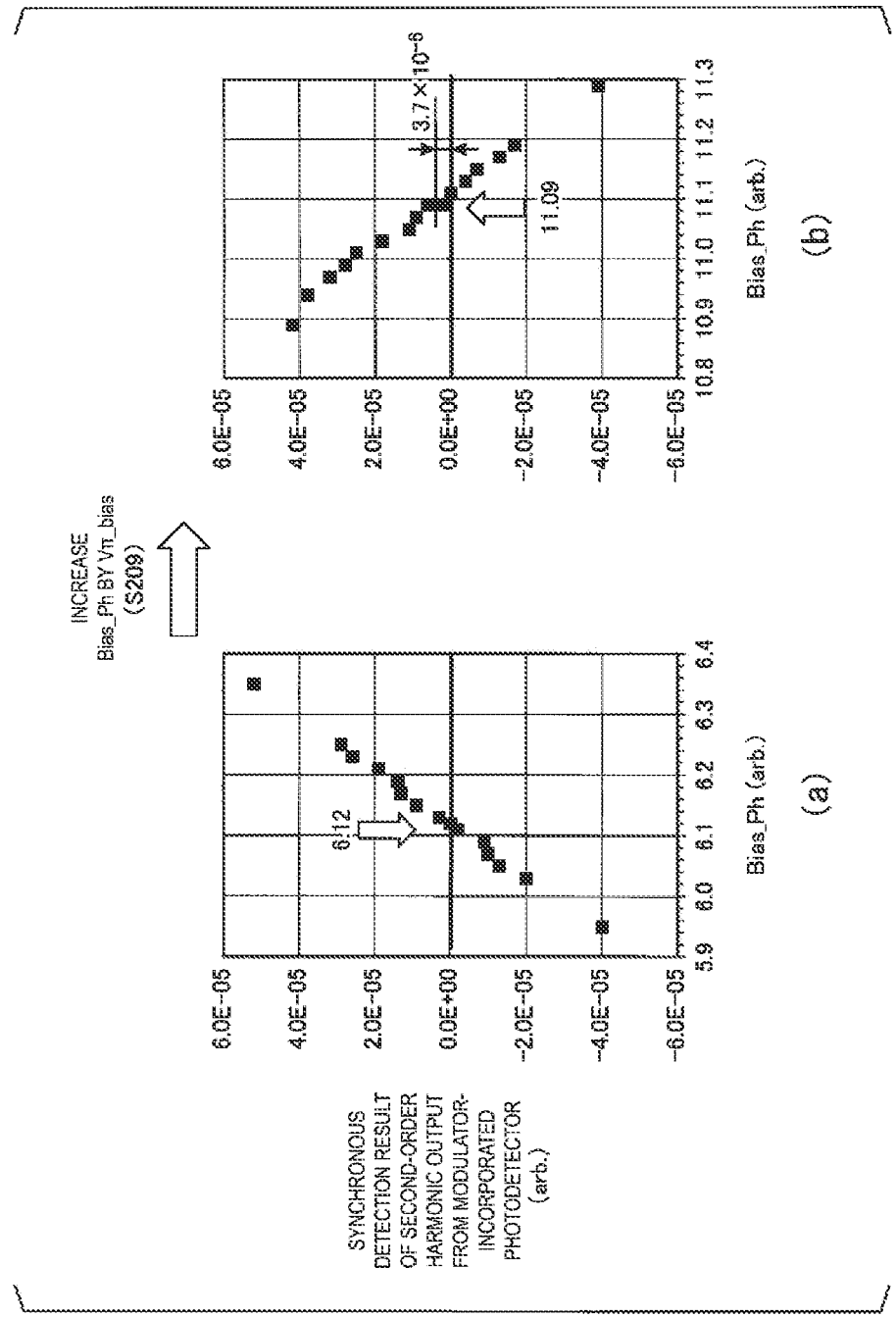
FIG. 7 is graphs illustrating a principle confirmation experimental result according to the second embodiment.

FIGS. 6 and 7 illustrate principle confirmation experiment results of the second embodiment.

Two graphs in the left column of FIG. 6 indicate the light intensity in the signal output port 301 immediately before the process of step S209 in FIG. 5 (FIG. 6(a)) and results obtained by synchronously detecting the output of the IQ modulator-incorporated photodetector 300 in a state where the dithering is applied to the Bias_I (FIG. 6(b)).

The converged values of the biases immediately before the process in step S209 were Bias_I=6.20, Bias_Q=8.06, and Bias_Ph=6.12 (all arbitrary units). On the other hand, in FIG. 6, only the Bias_I is swept near 6.20 for an operation confirmation. The synchronous detection result was 0 at Bias_I=6.20 while the output light intensity in the signal output port 301 was minimal at Bias_I=6.1. If the ideal IQ optical modulator M was selected, the both values should match.

Next, results obtained when the same tests were conducted immediately after the process of step S209 are provided in two graphs in the right column of FIG. 6. FIG. 6(c) indicates a result obtained by synchronously detecting the light intensity in the signal output port 301, and FIG. 6(d) indicates results obtained by synchronously detecting the output of the IQ modulator-incorporated photodetector 300 in a state where the dithering is applied to the Bias_I. Bias_Ph was set to 11.09. This value was obtained when Bias_Ph was increased from 6.12 by V$\pi$_bias. The synchronous detection result is plotted at 0 when Bias_I=6.12. On the other hand, the output light intensity in the signal output port 301 was minimal at Bias_I=6.20. It is seen from the results that the switching of the constellations illustrated in FIG. 1 actually occurs.

Here, it is considered that the process of step S211 in FIG. 5 is performed. In FIG. 6, Bias_I was swept for an operation confirmation. In the process of step S211 of FIG. 5, the converged value immediately before the process of step S209 is used, and thus, the control processor 504 records the synchronous detection result at Bias_I=6.20 into the first memory. As illustrated in FIG. 6(d), the value is 4×10$^{-4}$. When the process of step S218 in FIG. 5 is performed, the control processor 504 subtracts 4×10$^{-4}$ from the synchronous detection result and adjusts Bias_I so that the result is 0. The control processor 504 performs a similar process on Bias_Q.

Here again, the experiment returned to bias values (Bias_I=6.20, Bias_Q=8.06, and Bias_Ph=6.12) immediately before the process of step S209, and only the Bias_I was swept near 6.12 for an operation confirmation. FIG. 7 are graphs indicating results of the operation confirmation. FIG. 7(a) indicates results obtained by measuring the synchronous detection of the second-order harmonic described in step S206 and step S207 in FIG. 5. In FIG. 7(a), the result is 0 at Bias_Ph=6.12. Next, as a result of the process in step S209, the Bias_Ph increases from 6.12 by Vπ_bias to 11.09.

Again, only the Bias_Ph was swept near 11.09 for an operation confirmation. FIG. 7(b) indicates results obtained by measuring the synchronous detection of the second-order harmonic described in steps S214 and S215 of FIG. 5. The process in step S215 of FIG. 5 is performed with the Bias_Ph immediately after the process in step S209, and thus, the control processor 504 records the synchronous detection result of the second-order harmonic at Bias_Ph=11.09, into the third memory. As illustrated in FIG. 7(b), the value is 3.7×10$^{-6}$. When the process of step S222 in FIG. 5 is performed, the control processor 504 subtracts 3.7×10$^{-6}$ from the synchronous detection result of the second-order harmonic and adjusts the Bias_Ph so that the subtraction result is 0.

It should be noted that in the synchronous detection result of the second-order harmonic illustrated in FIG. 7, a slop near the zero point changes before and after the process in step S209 of FIG. 5. Thus, it is necessary to invert a sign of a feedback gain of the Bias_Ph control in steps S207 and S222 of FIG. 5. That is, in step S207 of FIG. 5, the control processor 504 decreases the Bias_Ph if the synchronous detection result of the second-order harmonic is positive, and increases the Bias_Ph if the result is negative (see the left side of FIG. 7). However, the slope is in the opposite direction in step S222 of FIG. 5, and thus, the control processor 504 increases the Bias_Ph if the result obtained by subtracting the value stored in the third memory from the synchronous detection result of the second-order harmonic is positive and decreases the Bias_Ph if the result is negative (see the right side of FIG. 7).

These two slopes correspond to the sign of the optical phase difference $\theta_{OUT}=\pm\pi/2$ as described above. Thus, if it is necessary to select the sign in the in-service state for pre-equivalence and the like, the slope and a feedback gain are determined so that the slope after the process of step S209 corresponds to the desired sign.

It is empirically found that the correction amount recorded in the third memory is very small compared to the correction amounts recorded in the first memory and the second memory. Thus, a control program may be simplified by omitting the process of "subtracting the target value recorded in the third memory" in step S222 of FIG. 5.

Figure 8:
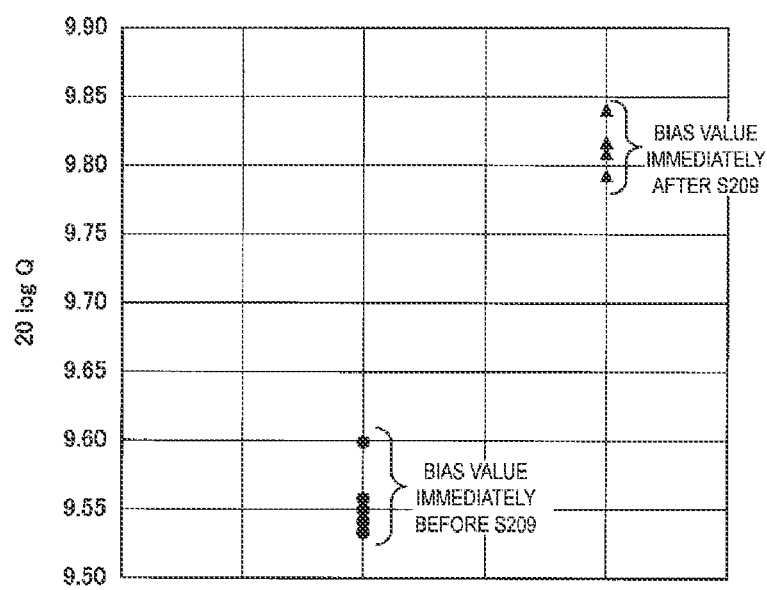
FIG. 8 is a graph illustrating a principle confirmation experimental result according to the second embodiment.

With these processes, the light output in the signal output port 301 is optimized. To confirm the optimization, the light output in the signal output port 301 was demodulated to measure a Q value. FIG. 8 is a graph indicating results obtained by measuring the Q value as a principle confirmation experiment result. A signal format is 16-QAM. A round symbol is obtained in a case where the demodulation was performed by using a bias value selected immediately before step S209, and a triangular symbol is obtained in a case where the demodulation was performed by using the bias value selected immediately after step S209 (increased by Vπ_bias only in the Bias_Ph). Six measurements were conducted for each of the bias values in consideration of variations in Q-value measurements. It is indicated that the use of the present embodiment significantly improves the Q value.

Variation of Second Embodiment

In the second embodiment, in controlling the Bias_I and the Bias_Q, the bias control circuit 50 applies the dithering to the Bias_I and the Bias_Q to perform control so that the synchronous detection is 0 during the startup sequence period, and so that the value obtained by subtracting the values recorded in the first memory and the second memory from the synchronous detection is 0 at an end of the startup sequence period. In other words, the bias control circuit 50 performs control so that the value of the synchronous detection is the same as the values recorded in the first memory and the second memory at the end of the startup sequence period.

However, a method of controlling the Bias_I and the Bias_Q is not limited to the above procedure, and may apply the drive-amplitude independent control method described in NPL 4. In this method, modulation efficiencies of the I-component MZ optical modulator 2a and the Q-component MZ optical modulator 2b are dithered. This can be achieved by applying the dithering to the gain of the differential amplifiers 3a and 3b in FIG. 4. If the I-component MZ optical modulator 2a and the Q-component MZ optical modulator 2b are semiconductor modulators, the dithering may be applied to the bias voltage to be applied to the V$_{data\_I}$ and the V$_{data\_Q}$. As described in NPL 4, at a time when the Bias_I and the Bias_Q reach optimal values, the amplitude of the dither component superimposed on the output intensity of the IQ optical modulator is not 0 but reaches maximum.

If this method is used, the steps S202, S204, S210, S212, S217, and S219 in FIG. 5 are changed, and the modulation efficiency of the I-component MZ optical modulator 2a and the modulation efficiency of the Q-component MZ optical modulator 2b are subject to be dithered. Further, step S203 and step S206 in FIG. 5 are changed, and the control processor 504 adjusts the Bias_I and the Bias_Q so that the dither amplitude is not 0 but maximized when the output from the monitor port 302 is subject to the synchronous detection.

In this method, the dithering is applied to a gain adjustment terminal of the differential amplifier, for example, and as a result, the circuit is somewhat complex. However, there is an advantage in this method in that it is not necessary to consider the problem that the light intensity in the optimum bias turns to the maximum instead of the minimum once the multi-level number and the amplitude of the drive waveform satisfy a specific condition.

Variation of First and Second Embodiments

In the embodiments heretofore, the description is provided about the error derived from the imperfections of the I-component MZ optical modulator 2a and the Q-component MZ optical modulator 2b and is provided on the assumption that the configuration of the optical multiplexing and demultiplexing unit 201 is ideal. However, if there is the imperfection in the optical multiplexing and demultiplexing unit 201, the correspondence relationship of $\theta_{MON}=\theta_{OUT}+\pi$ may be slightly corrupted. If this error cannot be ignored, the change amount ΔBias_Ph of the Bias_Ph required to cause a phase change equal to $\theta_{OUT}-\theta_{MON}$ may be evaluated in advance, and ΔBias_Ph may be used instead of Vπ_bias in each embodiment.

Further, in the embodiments described heretofore, no mention is made of a convergence speed of a loop (step S102 to step S104 in FIG. 3 or step S202 to step S207 in FIG. 5) in the startup sequence. The technology described in PTL 1 may be used in combination to more reliably and quickly converge the loop.

In the embodiments heretofore, an operation of writing the numerical value for error correction into the first memory to the third memory is performed for each startup sequence. However, depending on a usage environment of the optical transmitter 101, these error correction values do not greatly change, and thus, may be considered constant values. In such a case, the control processors 405 and 504 may not perform the write operation into the first memory to the third memory each time and may use the value recorded in the previous startup sequence as-is when the write operation is omitted in a second or later startup sequence.

In the embodiments heretofore, the description is provided on the assumption that the IQ optical modulator M is used for a single polarization. However, there is a commercially available IQ optical modulator of the type in which two of the configurations illustrated in FIG. 12 are arranged in parallel, and outputs from these configurations are polarization-multiplexed and sent to the transmission path. In this type of IQ optical modulator, two IQ modulator-incorporated photodetectors 300 are normally also arranged for each polarization, and thus, it is possible to employ the procedure of the present embodiment for each polarization.

Further, in the embodiments described heretofore, although the differential output type is employed for the modulator drive amplifier, some of commercially available IQ optical modulators include an IQ optical modulator driven by a single-phase output amplifier. In such an IQ optical modulator, the electric field inside the optical modulator is designed so that the two arms of the MZ optical modulator are driven in a push-pull fashion, and thus, the present embodiment is applicable. Further, in the embodiments described heretofore, the case is described as an example where the control processors 405 and 504 control the bias voltage for controlling the optical path lengths of the I-component MZ optical modulator 2a and the Q-component MZ optical modulator 2b, and the optical path length of the parent MZI, but the electric current applied to control these optical path lengths may be controlled.

Further, in the embodiments described heretofore, near the end of the startup sequence, the Bias_Ph is changed by Vπ_bias or ΔBias_Ph. The MZI has periodicity, and thus, it is possible to realize this change by increasing the voltage or the current of the Bias_Ph and it is possible to realize this change by decreasing the voltage or the current of the Bias_Ph. A direction of change may be selected such that the voltage or the current of the Bias_Ph approaches 0. Such a selection can suppress power consumption in the in-service state.

Further, in the embodiments described heretofore, a 2×2 optical coupler including two input ports and two output ports is employed for the optical multiplexing and demultiplexing unit 201. Instead of such a 2×2 optical coupler, a 1×2 optical coupler including two input ports and one output port may be employed for the optical multiplexing and demultiplexing unit 201. In this case, the modulated light output from the I-component MZ optical modulator 2a is input into one of the input ports of the 1×2 optical coupler, and the modulated light output from the Q-component MZ optical modulator 2b and passing through the Bias_Ph phase adjusting means 8c is input into the other of the input ports of the 1×2 optical coupler. On the other hand, one output port of the 1×2 optical coupler is optically coupled to the signal output port 301. The IQ modulator-incorporated photodetector 300 receives leaked light that does not enter and comes out of the optical waveguide configuring the signal output port 301, of the light output from the output port of the 1×2 optical coupler. If the optical electric field propagating through the signal output port 301 is newly defined as $E_{OUT}$, and the optical electric field of the leaked light received by the IQ modulator-incorporated photodetector 300 is newly defined as $E_{MON}$, the argument similar to that in the embodiments described heretofore holds.

Third Embodiment

In the first and second embodiments described heretofore, the bias control circuit performs the ABC by monitoring the average intensity, the peak intensity, or the RMS value of the optical QAM signal by using an IQ modulator-incorporated photodetector. However, in general, the band of the IQ modulator-incorporated photodetector is narrow, and thus, the IQ modulator-incorporated photodetector is not capable of demodulating the optical QAM signal. Thus, the bias control circuit in the first and second embodiments, which can perform the ABC, cannot easily perform more sophisticated control on the IQ optical modulator.

In an example, a case is provided in which the gains of the differential amplifier 3a that amplifies the Data_I and the differential amplifier 3b that amplifies the Data_Q are not the same across the ages. In this case, even though the bias is optimally maintained by the ABC, the constellation is degraded into a rectangular shape, not into a square shape. An advanced control in which such an IQ imbalance is detected and fed back to the gain of the differential amplifiers to correct the constellation into a square shape, is very difficult as long as the optical QAM signal is monitored by using the IQ modulator-incorporated photodetector.

To solve such problems, it is possible to employ a configuration where a more advanced control is performed on the IQ optical modulator if the optical receiver demodulates the optical electric field $E_{MON}$ output from the monitor port and checks the shape of the constellation of the demodulated optical QAM signal. A specific example of such a configuration is illustrated in FIG. 9.

Figure 9:
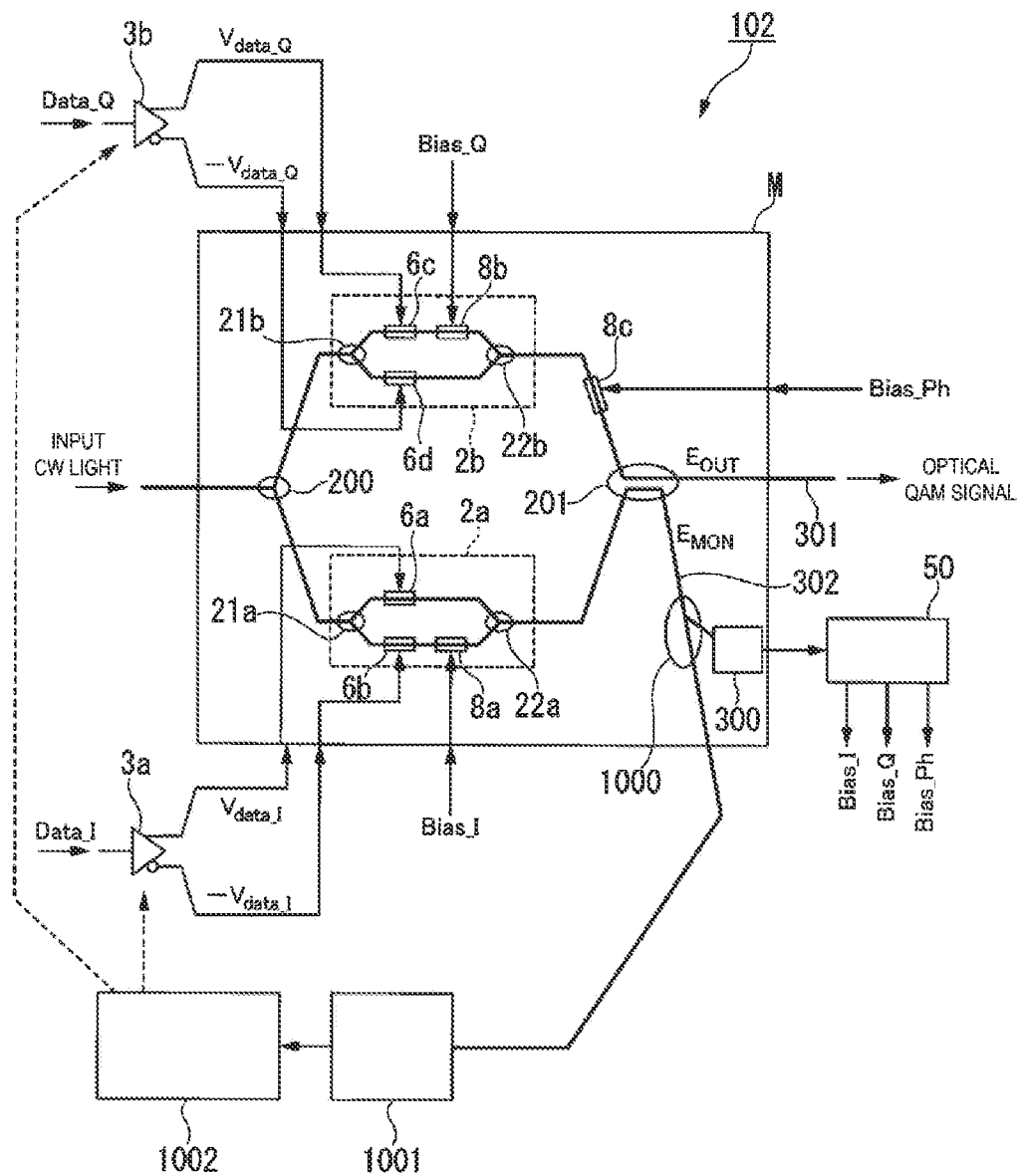
FIG. 9 is a block diagram illustrating an example of a configuration of an optical transmitter according to a third embodiment.

FIG. 9 is a block diagram illustrating an example of a configuration of an optical transmitter 102 according to a third embodiment. In FIG. 9, the same components as those of the optical transmitter 101 according to the second embodiment illustrated in FIG. 4 are denoted by the same reference signs and descriptions thereof are omitted. A large part of the configuration of the optical transmitter 102 is common to that of the optical transmitter 101 in the second embodiment. The optical transmitter 101 illustrated in FIG. 9 differs from the optical transmitter 101 illustrated in FIG. 4 in that the former further includes an optical branch unit 1000, an optical receiver 1001, and a control processor 1002.

The optical branch unit 1000 is disposed between the monitor port 302 and the IQ modulator-incorporated photodetector 300. The optical branch unit 1000 branches the modulated light output from the monitor port 302 into two. The optical branch unit 1000 outputs one of the branched modulated light beams to the IQ modulator-incorporated photodetector 300 and outputs the other of the branched modulated light beams to the optical receiver 1001. The optical receiver 1001 demodulates the modulated light received from the optical branch unit 1000 and outputs information on the demodulated optical QAM signal to the control processor 1002. It should be noted that unlike the optical multiplexing and demultiplexing unit 201, the optical branch unit 1000 includes only one input port, and thus, the two modulated light beams branched by the optical branch unit 1000 are substantially equivalent. That is, the modulated light received by the IQ modulator-incorporated photodetector 300 and the modulated light received by the optical receiver 1001 are the same, and there is no difference between these modulated light beams as in the case of the $E_{OUT}$ and the $E_{MON}$.

Inside the bias control circuit 50 of the present embodiment, similarly to the optical transmitter 101 according to the other embodiments and illustrated in FIG. 4, the control processor 504 is included. Here, a differences between the processing performed by the control processor 504 and the processing performed by the control processor 1002 will be described. Before the control processor 1002 starts the operation, firstly, the control processor 504 executes the processing of step S201 to step S208 in the flowchart illustrated in FIG. 5. If the bias is significantly detuned at step S201, it is difficult or impossible to demodulate the optical QAM signal generated from the random signals for training. However, the control processor 504 determines YES in determination processing in step S208, and the bias is optimized at a time when the loop processing is ended. Thus, the optical receiver 1001 is capable of demodulating the optical QAM signal.

The control processor 504 determines YES in the determination processing of step S208 and suspends the operation once the loop processing is ended, and transfers the control to the control processor 1002. The control processor 1002 analyzes the optical QAM signal demodulated by the optical receiver 1001, and fine-adjusts the gains of the differential amplifier 3a and the differential amplifier 3b so that the shape of the constellation obtained by the analysis is optimal. Alternatively, the control processor 1002 may calculate frequency characteristics of the differential amplifier 3a and the differential amplifier 3b by mutually comparing a spectral analysis of the Data_I and the Data_Q with a spectral analysis of the demodulation signal, and apply pre-emphasis to the Data_I and the Data_Q so that a flatter frequency characteristic is obtained. Alternatively, in order to more precisely match each bias to the optimum point, the control processor 1002 may analyze the optical QAM signal demodulated by the optical receiver 1001 and perform a second bias adjustment operation so that the shape of the constellation obtained by the analysis is optimal. Unlike the control processor 504, the control processor 1002 receives information on the optical electric field rather than the light intensity of the modulated light, and thus, is capable of analyzing the shape of the constellation. The constellation is square if each bias is optimal as described above, and thus, the control processor 1002 utilizes this property to adjust the Bias_I, the Bias_Q, and the Bias_Ph so that the shape of the constellation is optimal.

It should be noted, however, that the optimization operation by the control processor 1002 described above is an optimization for the optical QAM signal output from the monitor port 302. Thus, the optical QAM signal output from the signal output port 301 is not necessarily optimized. For example, as shown in the first step of FIG. 1, the optical QAM signal may be rather degraded.

To solve this problem, the optical transmitter 102 returns the control back to the control processor 504, and performs processing of step S209 and the subsequent processing in FIG. 5. Thus, it is possible to optimize the optical QAM signal output from the signal output port 301 according to the procedure described above.

Variation of Third Embodiment

In FIG. 9, the IQ optical modulator M and the optical receiver 1001 are illustrated as independent components. However, many of commercial optical transceivers have a configuration in which a transmitter and a receiver are accommodated in the same housing. Thus, it is more desirable to utilize the receiver accommodated within the same optical transceiver as the optical receiver 1001. A specific example of such a configuration is illustrated in FIG. 10.

Figure 10:
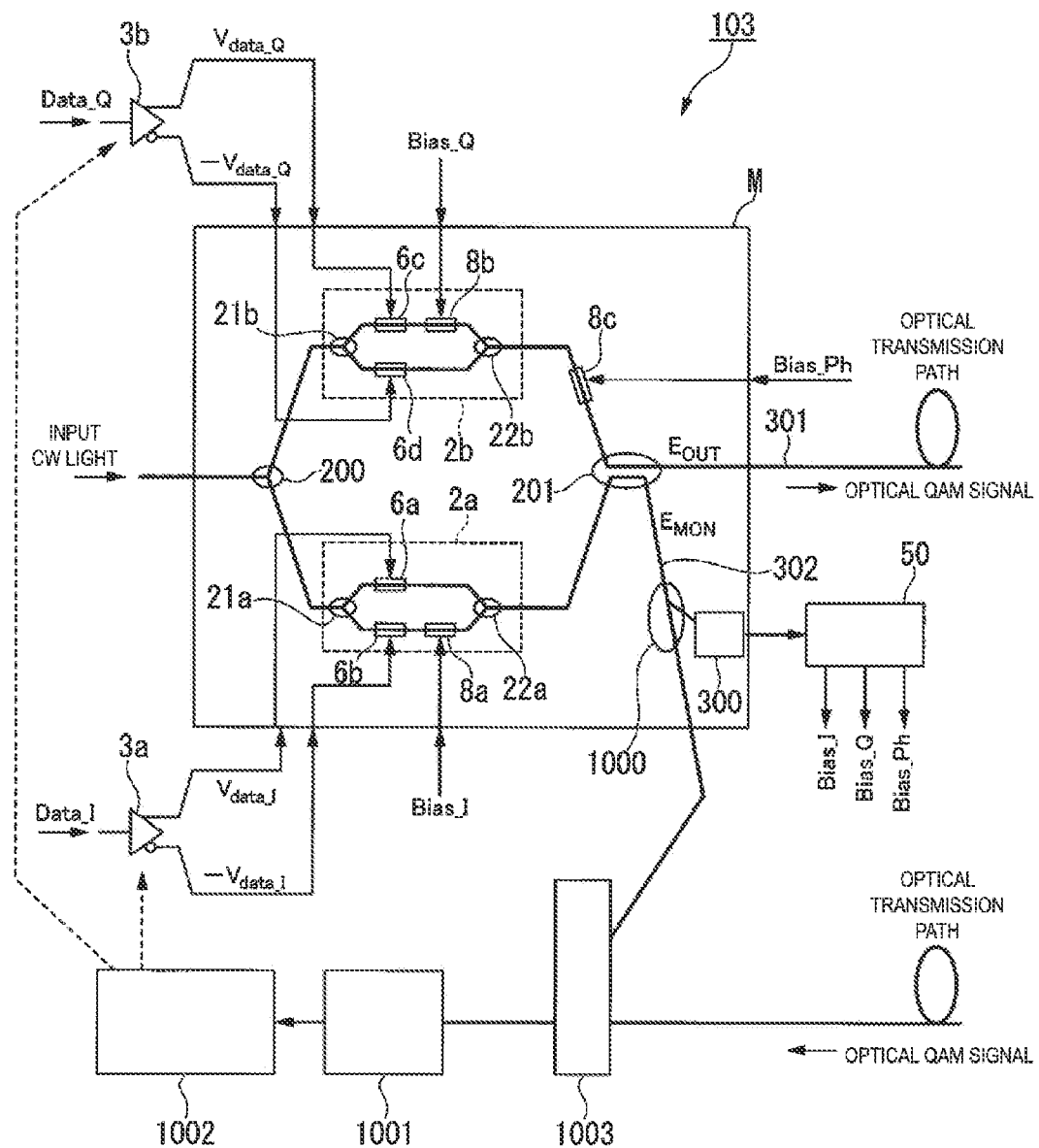
FIG. 10 is a block diagram illustrating another example of a configuration of the optical transmitter according to the third embodiment.

FIG. 10 is a block diagram illustrating an example of a configuration of an optical transmitter 103. In FIG. 10, the same components as those of the optical transmitter 102 according to the third embodiment illustrated in FIG. 9 are denoted by the same reference signs and descriptions thereof are omitted. The optical transmitter 103 illustrated in FIG. 10 differs from the optical transmitter 102 illustrated in FIG. 9 in that the former further includes an optical switch 1003. The optical switch 1003 selects either the optical QAM signal sent through the optical transmission path or the optical QAM signal sent from the monitor port 302, and inputs the selected optical QAM signal to the optical receiver 1001.

In starting up the optical transceiver, the optical switch 1003 selects the optical QAM signal from the monitor port 302 and inputs the selected optical QAM signal to the optical receiver 1001. The optical transmitter 103 optimizes the IQ optical modulator M according to the procedure described in the third embodiment. At the end of the optimization, the optical switch 1003 selects the optical QAM signal through the optical transmission path and inputs the selected optical QAM signal to the optical receiver 1001. Similarly to a receiver in a general optical transceiver, the optical receiver 1001 demodulates optical QAM signals transmitted from another optical transceiver in a remote location.

The optical transmitter 103 in a configuration illustrated in FIG. 10 is not capable of simultaneously performing the optimization of the IQ optical modulator M and the demodulation of optical signals transmitted from the other optical transceiver. Thus, there is a problem in that it is not possible to monitor the IQ optical modulator M and optimize the state of the IQ optical modulator M in the in-service state. An example of a configuration for resolving this problem is illustrated in FIG. 11.

Figure 11:
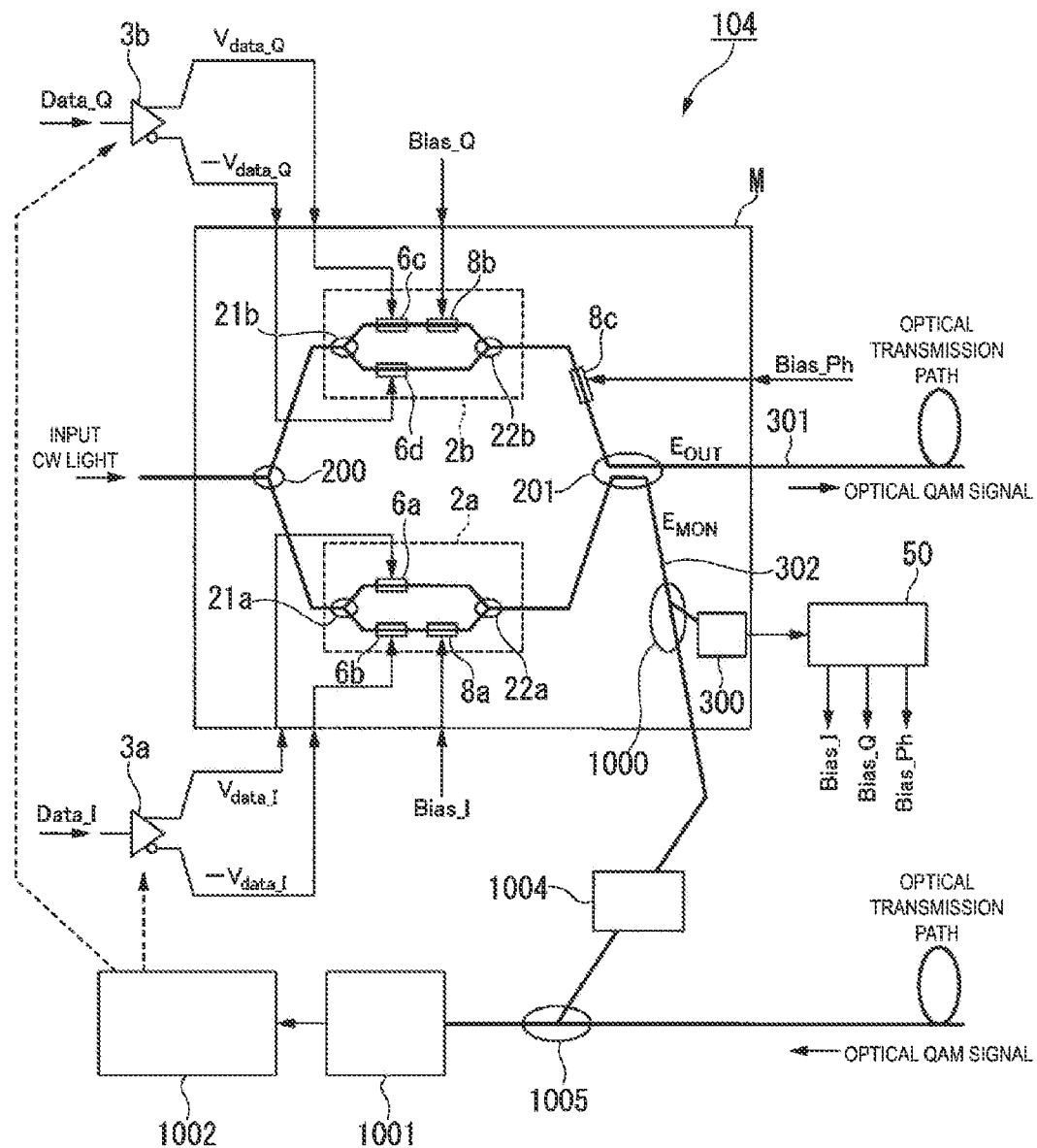
FIG. 11 is a block diagram illustrating another example of a configuration of the optical transmitter according to the third embodiment.

FIG. 11 is a block diagram illustrating an example of a configuration of an optical transmitter 104. In FIG. 11, the same parts as those of the optical transmitter 102 illustrated in FIG. 9 are denoted by the same reference signs and descriptions thereof are omitted. The optical transmitter 104 illustrated in FIG. 11 differs from the optical transmitter 102 illustrated in FIG. 9 in that the former further includes a wavelength shifter 1004 and an optical multiplexing unit 1005.

The wavelength shifter 1004 changes a carrier wavelength of an optical QAM signal output from the monitor port 302 and outputs the optical QAM signal to the optical multiplexing unit 1005. The optical multiplexing unit 1005 multiplexes the optical QAM signal output from the wavelength shifter 1004 and an optical QAM signal sent through the optical transmission path, and inputs the resultant signals to the optical receiver 1001.

The optical receiver 1001 collectively receives the optical QAM signal sent through the optical transmission path and the optical QAM signal sent from the monitor port 302, and outputs the both signals to the control processor 1002. The carrier wavelengths of the two optical QAM signals collectively received by the optical receiver 1001 are different from each other, and thus, the control processor 1002 is capable of separating the two optical QAM signals.

As a specific example, the optical receiver 1001 performs digital coherent demodulation. Here, f1 denotes a difference frequency between a wavelength of local oscillation light built in the optical receiver 1001 and the carrier wavelength of the optical QAM signal sent through the optical transmission path, and f2 denotes a difference frequency between a wavelength of local oscillation light built in the optical receiver 1001 and the carrier wavelength of the optical QAM signal sent from the monitor port 302. If the difference frequency f1 and the difference frequency f2 are sufficiently separated, the optical receiver 1001 that performs the digital coherent demodulation is capable of separating, by filtering processing, the optical QAM signal sent through the optical transmission path and the optical QAM signal sent from the monitor port 302 to demodulate the signals. With such a configuration, it is possible to simultaneously realize two roles described below with the single optical receiver 1001. The first role is a role as a receiver that demodulates a signal sent through the optical transmission path. The second role is a role as a controller that monitors the output light of the IQ optical modulator M to best maintain a signal quality of the output light.

It is more desirable that a path of light from the monitor port 302 to the optical receiver 1001 has polarization maintaining characteristics. With such a configuration, two effects described below are achieved. The first effect is that if the output light of the IQ optical modulator M is a single polarization, it is easy to increase an interference efficiency between the local oscillation light and the signal light. The second effect is that if the output light of the IQ optical modulator M is polarization-multiplexed, it is possible to simplify polarization separation processing during the demodulation.

As described above, an automatic bias control circuit (the bias control circuits 40, 50, for example) according to the embodiments controls a bias voltage or a bias power applied to an IQ optical modulator. The IQ optical modulator includes an optical branch unit (the optical branch unit 200, for example, it may also be referred to as "optical branch"), an in-phase component MZ optical modulator (the I-component MZ optical modulator 2a, for example), a quadrature component MZ optical modulator (the Q-component MZ optical modulator 2b, for example), and an optical multiplexing and demultiplexing unit (the optical multiplexing and demultiplexing unit 201, for example, it may also be referred to as "multiplexer and demultiplexer"). The optical branch unit branches continuous light into two, that is, in-phase component light and quadrature component light. The in-phase component MZ optical modulator is a Mach-Zehnder interferometer that modulates the in-phase component light obtained by branching the continuous light by the optical branch unit. The quadrature component MZ optical modulator is a Mach-Zehnder interferometer that modulates the quadrature component light obtained by branching the continuous light by the optical branch unit. The optical multiplexing and demultiplexing unit branches an optical QAM signal described below and outputs the signals from each of a signal output port and a monitor port. The optical QAM signal is an optical QAM signal obtained by adjusting an optical phase between the two modulated light beams by a phase adjustment unit (phase adjuster), and then multiplexing the light beams. The two modulated light beams are modulated light output from the in-phase component MZ optical modulator and modulated light output from the quadrature component MZ optical modulator.

The automatic bias control circuit includes an in-phase component bias power source (the Bias_I voltage generator 7a, for example), a quadrature component bias power source (the Bias_Q voltage generator 7b, for example), a phase adjustment bias power source (the Bias_Ph voltage generator 7c, for example), a monitor unit (which may include the distributor 400, the low-pass filter 401, the first ADC 402, the RMS measurement circuit 403, the second ADC 404, the control processor 405, and the synchronous detection circuit 503, for example, and may also be referred to as "monitor"), and a control unit (which may include control processors 405 and 504, for example, and may also be referred to as "controller"). The in-phase component bias power source generates a voltage or a current applied to the in-phase component MZ optical modulator to bias the in-phase component MZ optical modulator and the quadrature component MZ optical modulator to an area near a null point. The quadrature component bias power source generates a voltage or a current applied to the quadrature component MZ optical modulator to bias the in-phase component MZ optical modulator and the quadrature component MZ optical modulator to an area near a null point. The phase adjustment bias power source generates a voltage or a current for the phase adjustment unit to determine a change amount of an optical phase applied to between the modulated light beams output from the in-phase component MZ optical modulator and the quadrature component MZ optical modulator. The monitor unit monitors an optical QAM signal output from the monitor port. The control unit controls, based on a monitor result from the monitor unit, a voltage or a current generated by each of the in-phase component bias power source, the quadrature component bias power source, and the phase adjustment bias power source. The control unit performs two processes described below in a startup sequence of the IQ optical modulator. The first process is a first-stage process of controlling a voltage or a current generated from each of the in-phase component bias power source, the quadrature component bias power source, and the phase adjustment bias power source so that a signal quality of the optical QAM signal obtained from the monitor result approaches a target quality, for example, the best quality. The second process is a second-stage process of obtaining a voltage or a current by changing a voltage or a current output from the phase adjustment bias power source by a predetermined change amount ΔBias_Ph, after a completion of the first-stage process. For example, the change amount ΔBias_Ph is an amount by which an optical phase is changed, by the phase adjustment unit, by π radian. The control unit may control, in time division (time sharing), a voltage or a current generated from each of the in-phase component bias power source, the quadrature component bias power source, and the phase adjustment bias power source.

The monitor unit monitors, for example, at least one of an average intensity, a peak intensity, or an RMS value of the optical QAM signal. In the first-stage process, the control unit controls a voltage or a current generated from each of the in-phase component bias power source, the quadrature component bias power source, and the phase adjustment bias power source so that the monitor result approaches a maximum or a minimum. The control unit may perform, in the startup sequence, a third-stage process of recording, as a new target value, a result obtained by monitoring the optical QAM signal by the monitor unit, into a memory, after a completion of the second-stage process. The control unit regularly compares the monitor result with the target value stored in the memory after a completion of the third-stage process. The control unit controls, if a deviation is detected as a result of the comparison, a voltage or a current generated from each of the in-phase component bias power source, the quadrature component bias power source, and the phase adjustment bias power source so that the monitor result approaches the target value.

The automatic bias control circuit may further include a dithering unit (dither generator) that applies dithering to at least one of an output of the in-phase component bias power source, an output of the quadrature component bias power source, an output of the phase adjustment bias power source, a modulation efficiency of the in-phase component MZ optical modulator, or a modulation efficiency of the quadrature component MZ optical modulator. The monitor unit monitors at least one of an average intensity, a peak intensity, or an RMS value of the optical QAM signal output from the monitor port. Thereafter, the control unit synchronously detects, in the first-stage process, a dither component with a frequency fd or a higher harmonic wave of the dither component superimposed on the monitor result obtained when a dithering at a constant frequency fd is applied by the dithering unit, and controls a voltage or a current generated from each of three power sources described below so that an absolute value of the synchronous detection result approaches a maximum or 0. The three power sources are the in-phase component bias power source, the quadrature component bias power source, and the phase adjustment bias power source. The control unit may synchronously detect, in the startup sequence and after a completion of the second-stage process, a dither component with a frequency fd or a higher harmonic wave of the dither component superimposed on the monitor result obtained when a dithering at a constant frequency fd is applied by the dithering unit, and perform a third-stage process of recording the synchronous detection result, as a new target value, into a memory. The control unit regularly synchronously detects, after a completion of the third-stage process, a dither component with a frequency fd or a higher harmonic wave of the dither component superimposed on the monitor result obtained when a dithering at a constant frequency fd is applied by the dithering unit, and compares the synchronous detection result with the target value recorded in the memory to control, if a deviation is detected as a result of the comparison, a voltage or a current generated from each of three power sources described below so that the synchronous detection result approaches the target value. The three power sources are the in-phase component bias power source, the quadrature component bias power source, and the phase adjustment bias power source.

The automatic bias control circuit may further include a demodulation unit (for example, the optical receiver 1001, which may also be referred to as "demodulator") that demodulates the optical QAM signal output from the monitor port. The control unit (for example, the control processor 1002) performs adjustment described below so that a signal quality of the optical QAM signal demodulated by the demodulation unit improves. The adjustment is a fine adjustment applied to a voltage or a current generated from each of the in-phase component bias power source, the quadrature component bias power source, or the phase adjustment bias power source, or the peripheral circuit used when a drive signal is applied to the IQ modulator. The peripheral circuit is, for example, the differential amplifier 3a, the differential amplifier 3b, or a circuit that applies pre-emphasis to a drive signal. The drive signal is, for example, the Data_I and the Data_Q.

The automatic bias control circuit may further include a switch unit (the optical switch 1003) that selects and inputs, into the demodulation unit, one of an optical QAM signal output from the monitor port and an optical transmission signal sent through an optical transmission path.

The automatic bias control circuit may further include a wavelength change unit (the wavelength shifter 1004, for example) that changes a wavelength of an optical QAM signal output from the monitor port and inputs the optical QAM signal with the changed wavelength into the demodulation unit.

The embodiments of the present invention have been described above in detail with reference to the drawings. However, specific configurations are not limited to those embodiments, and include any design or the like within the scope not departing from the gist of the present invention.

INDUSTRIAL APPLICABILITY

The present invention may be applied to bias control of an optical modulator using nested Mach-Zehnder interferometers.

REFERENCE SIGNS LIST

M IQ optical modulator
2a MZ optical modulator
2b MZ optical modulator
3a Differential amplifier
3b Differential amplifier
6a First I-component modulation unit
6b Second I-component modulation unit
6c First Q-component modulation unit
6d Second Q-component modulation unit
7a Bias_I voltage generator
7b Bias_Q voltage generator
7c Bias_Ph voltage generator
8a Bias_I phase adjusting means
8b Bias_Q phase adjusting means
8c Bias_Ph phase adjusting means
40 Bias control circuit
50 Bias control circuit
100 Optical transmitter
101 Optical transmitter
102 Optical transmitter
103 Optical transmitter
104 Optical transmitter
200 Optical branch unit
201 Optical multiplexing and demultiplexing unit
202 Optical multiplexing unit
203 Optical branch unit
300 IQ modulator-incorporated photodetector
301 Signal output port
302 Monitor port
400 Distributor
401 Low-pass filter
402 First analog-to-digital converter
403 RMS measurement circuit
404 Second analog-to-digital converter
405 Control processor
406 First non-volatile memory
407 Second non-volatile memory
501 Multiplexer
502 Multiplexer 503 Synchronous detection circuit
504 Control processor
505 First non-volatile memory
506 Second non-volatile memory
507 Third non-volatile memory
1000 Optical branch unit
1001 Optical receiver
1002 Control processor
1003 Optical switch
1004 Wavelength shifter
1005 Optical multiplexing unit

The invention claimed is:

1. An automatic bias control circuit for controlling a bias voltage or a bias power applied to an in-phase/quadrature (IQ) optical modulator, wherein
the IQ optical modulator includes:
an optical branch configured to branch continuous light into two being in-phase component light and quadrature component light;
an in-phase component MZ optical modulator being a Mach-Zehnder interferometer, the in-phase component MZ optical modulator configured to modulate the in-phase component light obtained by branching the continuous light by the optical branch;
a quadrature component MZ optical modulator being a Mach-Zehnder interferometer, the quadrature component MZ optical modulator configured to modulate the quadrature component light obtained by branching the continuous light by the optical branch; and
an optical multiplexer and demultiplexer configured to branch an optical quadrature amplitude modulation (QAM) signal obtained by multiplexing modulated light output from the in-phase component MZ optical modulator and modulated light output from the quadrature component MZ optical modulator after a phase adjuster adjusts an optical phase between the modulated light output from the in-phase component MZ optical modulator and the modulated light output from the quadrature component MZ optical modulator, and output the branched signals from each of a signal output port and a monitor port,
the automatic bias control circuit includes:
an in-phase component bias power source configured to generate a voltage or a current applied to the in-phase component MZ optical modulator to bias the in-phase component MZ optical modulator and the quadrature component MZ optical modulator to an area near a null point;
a quadrature component bias power source configured to generate a voltage or a current applied to the quadrature component MZ optical modulator to bias the in-phase component MZ optical modulator and the quadrature component MZ optical modulator to an area near a null point;
a phase adjustment bias power source configured to generate a voltage or a current to determine a change amount of the optical phase applied by the phase adjuster;
a monitor configured to monitor the optical QAM signal output from the monitor port; and
a controller configured to control, based on a monitor result from the monitor, a voltage or a current generated from each of the in-phase component bias power source, the quadrature component bias power source, and the phase adjustment bias power source, and wherein
the controller performs a first-stage process of controlling a voltage or a current generated from each of the in-phase component bias power source, the quadrature component bias power source, and the phase adjustment bias power source so that a signal quality of the optical QAM signal obtained from the monitor result approaches a target quality, in startup sequences of the IQ optical modulator, and a second-stage process of obtaining a voltage or a current by changing a voltage or a current output from the phase adjustment bias power source by a predetermined change amount ΔBias_Ph, after a completion of the first-stage process,
the monitor monitors at least one of an average intensity, a peak intensity, or an RMS value of the optical QAM signal output from the monitor port, and
the controller performs, in the startup sequences, a third-stage process of recording, as a new target value, a result obtained by monitoring the optical QAM signal by the monitor, into a memory, after a completion of the second-stage process, regularly compares the monitor result with the target value stored in the memory after a completion of the third-stage process, and controls, if a deviation is detected as a result of the comparison, a voltage or a current generated from each of the in-phase component bias power source, the quadrature component bias power source, and the phase adjustment bias power source so that the monitor result approaches the target value.

2. The automatic bias control circuit according to claim 1, wherein the monitor monitors at least one of an average intensity, a peak intensity, or an RMS value of the optical QAM signal output from the monitor port, and
the controller controls, in the first-stage process, a voltage or a current generated from each of the in-phase component bias power source, the quadrature component bias power source, and the phase adjustment bias power source so that the monitor result approaches a maximum or a minimum.

3. The automatic bias control circuit according to claim 1, further comprising: a dither generator configured to apply dithering to at least one of an output of the in-phase component bias power source, an output of the quadrature component bias power source, an output of the phase adjustment bias power source, a modulation efficiency of the in-phase component MZ optical modulator, or a modulation efficiency of the quadrature component MZ optical modulator,
wherein the monitor monitors at least one of an average intensity, a peak intensity, or an RMS value of the optical QAM signal output from the monitor port, and
the controller synchronously detects, in the first-stage process, a dither component with a frequency fd or a higher harmonic wave of the dither component superimposed on the monitor result obtained when a dithering at a constant frequency fd is applied by the dither generator, and controls a voltage or a current generated from each of the in-phase component bias power source, the quadrature component bias power source, and the phase adjustment bias power source so that an absolute value of the synchronous detection result approaches a maximum or 0.

4. The automatic bias control circuit according to claim 1, wherein the change amount ΔBias_Ph is an amount by which an optical phase is changed, by the phase adjuster, by $\pi$ radian.

5. The automatic bias control circuit according to claim 1, wherein the controller controls, in time division, a voltage or a current generated from each of the in-phase component bias power source, the quadrature component bias power source, and the phase adjustment bias power source.

6. The automatic bias control circuit according to claim 1, wherein the memory is a non-volatile memory, and
the controller uses the last target value recorded in the memory if the third-stage process is not performed in a second or later startup sequence of the startup sequences.

7. An automatic bias control circuit for controlling a bias voltage or a bias power applied to an in-phase/quadrature (IQ) optical modulator, wherein
the IQ optical modulator includes:
an optical branch configured to branch continuous light into two being in-phase component light and quadrature component light;
an in-phase component MZ optical modulator being a Mach-Zehnder interferometer, the in-phase component MZ optical modulator configured to modulate the in-phase component light obtained by branching the continuous light by the optical branch;
a quadrature component MZ optical modulator being a Mach-Zehnder interferometer, the quadrature component MZ optical modulator configured to modulate the quadrature component light obtained by branching the continuous light by the optical branch; and
an optical multiplexer and demultiplexer configured to branch an optical quadrature amplitude modulation (QAM) signal obtained by multiplexing modulated light output from the in-phase component MZ optical modulator and modulated light output from the quadrature component MZ optical modulator after a phase adjuster adjusts an optical phase between the modulated light output from the in-phase component MZ optical modulator and the modulated light output from the quadrature component MZ optical modulator, and output the branched signals from each of a signal output port and a monitor port,
the automatic bias control circuit includes:
an in-phase component bias power source configured to generate a voltage or a current applied to the in-phase component MZ optical modulator to bias the in-phase component MZ optical modulator and the quadrature component MZ optical modulator to an area near a null point;
a quadrature component bias power source configured to generate a voltage or a current applied to the quadrature component MZ optical modulator to bias the in-phase component MZ optical modulator and the quadrature component MZ optical modulator to an area near a null point;
a phase adjustment bias power source configured to generate a voltage or a current to determine a change amount of the optical phase applied by the phase adjuster;
a monitor configured to monitor the optical QAM signal output from the monitor port; and
a controller configured to control, based on a monitor result from the monitor, a voltage or a current generated from each of the in-phase component bias power source, the quadrature component bias power source, and the phase adjustment bias power source, and wherein
the controller performs a first-stage process of controlling a voltage or a current generated from each of the in-phase component bias power source, the quadrature component bias power source, and the phase adjustment bias power source so that a signal quality of the optical QAM signal obtained from the monitor result approaches a target quality, in startup sequences of the IQ optical modulator, and a second-stage process of obtaining a voltage or a current by changing a voltage or a current output from the phase adjustment bias power source by a predetermined change amount ΔBias_Ph, after a completion of the first-stage process,
the automatic bias control circuit further comprises a dither generator configured to apply dithering to at least one of an output of the in-phase component bias power source, an output of the quadrature component bias power source, an output of the phase adjustment bias power source, a modulation efficiency of the in-phase component MZ optical modulator, or a modulation efficiency of the quadrature component MZ optical modulator,
the monitor monitors at least one of an average intensity, a peak intensity, or an RMS value of the optical QAM signal output from the monitor port, and
the controller synchronously detects, in the startup sequences and after a completion of the second-stage process, a dither component with a frequency fd or a higher harmonic wave of the dither component superimposed on the monitor result obtained when a dithering at a constant frequency fd is applied by the dither generator, performs a third-stage process of recording, as a new target value, the synchronous detection result, into a memory, regularly synchronously detects, after a completion of the third-stage process, a dither component with a frequency fd or a higher harmonic wave of the dither component superimposed on the monitor result obtained when a dithering at a constant frequency fd is applied by the dither generator, compares the synchronous detection result with the target value recorded in the memory, and controls, if a deviation is detected as a result of the comparison, a voltage or a current generated from each of the in-phase component bias power source, the quadrature component bias power source, and the phase adjustment bias power source so that the synchronous detection result approaches the target value.

8. The automatic bias control circuit according to claim 7, wherein the memory is a non-volatile memory, and the controller finally uses the target value recorded in the memory if the third-stage process is not performed in a second or later startup sequence of the startup sequences.

9. The automatic bias control circuit according to claim 7, wherein the monitor monitors at least one of an average intensity, a peak intensity, or an RMS value of the optical QAM signal output from the monitor port, and
the controller controls, in the first-stage process, a voltage or a current generated from each of the in-phase component bias power source, the quadrature component bias power source, and the phase adjustment bias power source so that the monitor result approaches a maximum or a minimum.

10. The automatic bias control circuit according to claim 7, further comprising: a dither generator configured to apply dithering to at least one of an output of the in-phase component bias power source, an output of the quadrature component bias power source, an output of the phase adjustment bias power source, a modulation efficiency of the in-phase component MZ optical modulator, or a modulation efficiency of the quadrature component MZ optical modulator, wherein the monitor monitors at least one of an average intensity, a peak intensity, or an RMS value of the optical QAM signal output from the monitor port, and the controller synchronously detects, in the first-stage process, a dither component with a frequency fd or a higher harmonic wave of the dither component superimposed on the monitor result obtained when a dithering at a constant frequency fd is applied by the dither generator, and controls a voltage or a current generated from each of the in-phase component bias power source, the quadrature component bias power source, and the phase adjustment bias power source so that an absolute value of the synchronous detection result approaches a maximum or 0.

11. The automatic bias control circuit according to claim 7, wherein the change amount ΔBias_Ph is an amount by which an optical phase is changed, by the phase adjuster, by π radian.

12. The automatic bias control circuit according to claim 7, wherein the controller controls, in time division, a voltage or a current generated from each of the in-phase component bias power source, the quadrature component bias power source, and the phase adjustment bias power source.

13. An automatic bias control circuit for controlling a bias voltage or a bias power applied to an in-phase/quadrature (IQ) optical modulator, wherein the IQ optical modulator includes:

an optical branch configured to branch continuous light into two being in-phase component light and quadrature component light;

an in-phase component MZ optical modulator being a Mach-Zehnder interferometer, the in-phase component MZ optical modulator configured to modulate the in-phase component light obtained by branching the continuous light by the optical branch;

a quadrature component MZ optical modulator being a Mach-Zehnder interferometer, the quadrature component MZ optical modulator configured to modulate the quadrature component light obtained by branching the continuous light by the optical branch; and an optical multiplexer and demultiplexer configured to branch an optical quadrature amplitude modulation (QAM) signal obtained by multiplexing modulated light output from the in-phase component MZ optical modulator and modulated light output from the quadrature component MZ optical modulator after a phase adjuster adjusts an optical phase between the modulated light output from the in-phase component MZ optical modulator and the modulated light output from the quadrature component MZ optical modulator, and output the branched signals from each of a signal output port and a monitor port, the automatic bias control circuit includes:

an in-phase component bias power source configured to generate a voltage or a current applied to the in-phase component MZ optical modulator to bias the in-phase component MZ optical modulator and the quadrature component MZ optical modulator to an area near a null point;

a quadrature component bias power source configured to generate a voltage or a current applied to the quadrature component MZ optical modulator to bias the in-phase component MZ optical modulator and the quadrature component MZ optical modulator to an area near a null point;

a phase adjustment bias power source configured to generate a voltage or a current to determine a change amount of the optical phase applied by the phase adjuster;

a monitor configured to monitor the optical QAM signal output from the monitor port; and a controller configured to control, based on a monitor result from the monitor, a voltage or a current generated from each of the in-phase component bias power source, the quadrature component bias power source, and the phase adjustment bias power source, and wherein the controller performs a first-stage process of controlling a voltage or a current generated from each of the in-phase component bias power source, the quadrature component bias power source, and the phase adjustment bias power source so that a signal quality of the optical QAM signal obtained from the monitor result approaches a target quality, in startup sequences of the IQ optical modulator, and a second-stage process of obtaining a voltage or a current by changing a voltage or a current output from the phase adjustment bias power source by a predetermined change amount ΔBias_Ph, after a completion of the first-stage process, the automatic bias control circuit further comprises a demodulator configured to demodulate the optical QAM signal output from the monitor port, and the controller adjusts a voltage or a current generated from each of the in-phase component bias power source, the quadrature component bias power source, and the phase adjustment bias power source, or adjusts a gain or a frequency characteristic of a peripheral circuit used when a drive signal is applied to the IQ optical modulator so that a shape of a constellation of the optical QAM signal demodulated by the demodulator becomes square.

14. The automatic bias control circuit according to claim 13, further comprising: a switch unit configured to select and input, into the demodulator, one of the optical QAM signal output from the monitor port and an optical transmitted signal sent through an optical transmission line.

15. The automatic bias control circuit according to claim 13, wherein an optical transmission path from the monitor port to the demodulator is polarization-maintaining.

16. The automatic bias control circuit according to claim 13, further comprising: a wavelength shifter configured to change a wavelength of the optical QAM signal output from the monitor port and input the optical QAM signal with the changed wavelength into the demodulator.

17. The automatic bias control circuit according to claim 13, wherein the monitor monitors at least one of an average intensity, a peak intensity, or an RMS value of the optical QAM signal output from the monitor port, and the controller controls, in the first-stage process, a voltage or a current generated from each of the in-phase component bias power source, the quadrature component bias power source, and the phase adjustment bias power source so that the monitor result approaches a maximum or a minimum.

18. The automatic bias control circuit according to claim 13, further comprising:

a dither generator configured to apply dithering to at least one of an output of the in-phase component bias power source, an output of the quadrature component bias power source, an output of the phase adjustment bias power source, a modulation efficiency of the in-phase component MZ optical modulator, or a modulation efficiency of the quadrature component MZ optical modulator, wherein the monitor monitors at least one of an average intensity, a peak intensity, or an RMS value of the optical QAM signal output from the monitor port, and the controller synchronously detects, in the first-stage process, a dither component with a frequency fd or a higher harmonic wave of the dither component superimposed on the monitor result obtained when a dithering at a constant frequency fd is applied by the dither generator, and controls a voltage or a current generated from each of the in-phase component bias power source, the quadrature component bias power source, and the phase adjustment bias power source so that an absolute value of the synchronous detection result approaches a maximum or 0.

19. The automatic bias control circuit according to claim 13, wherein the change amount $\Delta Bias\_Ph$ is an amount by which an optical phase is changed, by the phase adjuster, by $\pi$ radian.

20. The automatic bias control circuit according to claim 13, wherein the controller controls, in time division, a voltage or a current generated from each of the in-phase component bias power source, the quadrature component bias power source, and the phase adjustment bias power source.

* * * * *